US012784168B2

(12) United States Patent
Hoshino et al.

(10) Patent No.: US 12,784,168 B2
(45) Date of Patent: Nov. 3, 2026

(54) INFORMATION PROCESSING APPARATUS, INFORMATION PROCESSING METHOD, AND NON-TRANSITORY COMPUTER-READABLE STORAGE MEDIUM

(71) Applicant: CANON KABUSHIKI KAISHA, Tokyo (JP)

(72) Inventors: Shoichi Hoshino, Tokyo (JP); Atsushi Nogami, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 198 days.

(21) Appl. No.: 18/907,635

(22) Filed: Oct. 7, 2024

(65) Prior Publication Data

US 2025/0124558 A1 Apr. 17, 2025

(30) Foreign Application Priority Data

Oct. 16, 2023 (JP) ................................ 2023-178384

(51) Int. Cl.
*G06T 7/00* (2017.01)
*G06V 10/22* (2022.01)

(52) U.S. Cl.
CPC ............ *G06T 7/0002* (2013.01); *G06V 10/22* (2022.01); *G06T 2207/30184* (2013.01); *G06V 2201/07* (2022.01)

(58) Field of Classification Search
None
See application file for complete search history.

(56) References Cited

U.S. PATENT DOCUMENTS 11,898,966 B2 2/2024 Nogami
12,099,580 B2 9/2024 Nogami
2021/0281748 A1 9/2021 Nogami
2022/0019848 A1* 1/2022 Takayama ............... G06F 16/53
2022/0099588 A1* 3/2022 Hoshino ............ G01N 21/8851
2023/0410284 A1 12/2023 Nogami
2024/0151650 A1 5/2024 Nogami
2024/0428880 A1* 12/2024 Marks .................... G16B 15/00

FOREIGN PATENT DOCUMENTS

JP 5645730 B2 12/2014
JP 7156527 B2 10/2022

* cited by examiner

*Primary Examiner* — Talha M Nawaz
(74) *Attorney, Agent, or Firm* — Carter, DeLuca & Farrell LLP

(57) ABSTRACT

An information processing apparatus comprising: one or more processors; and one or more memories including instructions that, when executed by the one or more processors, cause the information processing apparatus to: acquire an image obtained by capturing a structure in which a detection target exists, execute first detection data acquisition processing of acquiring first detection data that is data related to a plurality of detection targets detected from the image, acquire combination information related to a combination of a first detection target included in the plurality of detection targets and a second detection target associated with the first detection target, and analyze the first detection target of the first detection data based on the second detection target combined with the first detection target indicated by the combination information, and generate an analysis result.

17 Claims, 18 Drawing Sheets

201

| COMBINATION ID | CONFIRMATION TARGET | REFERENCE TARGET |
|---|---|---|
| Id01 | CRACK | CHALKING |
| Id02 | FLAKING | REBAR EXPOSURE |
| Id03 | REBAR EXPOSURE | FLAKING |
| Id04 | EFFLORESCENCE | CRACK |
| Id05 | WATER LEAKAGE | CRACK |
| ... | ... | ... |

211

| COMBINATION ID | CONFIRMATION TARGET | REFERENCE TARGET | REMARKS |
|---|---|---|---|
| Id11 | CRACK | CHALKING | CHALKING OF 0.1mm OR MORE |
| Id12 | FLAKING | REBAR EXPOSURE | REBAR EXPOSURE OF 0.01m^2 OR MORE |

FIG. 2A

201

| COMBINATION ID | CONFIRMATION TARGET | REFERENCE TARGET |
|---|---|---|
| Id01 | CRACK | CHALKING |
| Id02 | FLAKING | REBAR EXPOSURE |
| Id03 | REBAR EXPOSURE | FLAKING |
| Id04 | EFFLORESCENCE | CRACK |
| Id05 | WATER LEAKAGE | CRACK |
| ... | ... | ... |

FIG. 2B

211

| COMBINATION ID | CONFIRMATION TARGET | REFERENCE TARGET | REMARKS |
|---|---|---|---|
| Id11 | CRACK | CHALKING | CHALKING OF 0.1mm OR MORE |
| Id12 | FLAKING | REBAR EXPOSURE | REBAR EXPOSURE OF 0.01m^2 OR MORE |

FIG. 2C

221

| COMBINATION ID | CONFIRMATION TARGET | REFERENCE TARGET | ANALYSIS CONDITION (REFERENCE DATA) | ANALYSIS CONDITION (ANALYSIS RANGE) | ANALYSIS CONDITION (OUTPUT ITEM) |
|---|---|---|---|---|---|
| Id21 | CRACK | CHALKING | ALL CHALKING | WITHIN DISTANCE OF 0.01m FROM REFERENCE DATA | DATA ID, AREA, DATA QUANTITY |
| Id22 | FLAKING | CRACK | MAXIMUM CRACK WIDTH ≥ 1mm | WITHIN DISTANCE OF 0.1m FROM CIRCUMSCRIBED QUADRILATERAL OF REFERENCE DATA | DATA ID, AREA, DATA QUANTITY |
| Id23 | FLAKING | CRACK | CLOSURE CRACK | WITHIN CIRCUMSCRIBED QUADRILATERAL OF REFERENCE DATA | DATA ID, AREA, DATA QUANTITY |
| Id24 | REBAR EXPOSURE | FLAKING | FLAKING AREA ≥ 0.01m^2 | WITHIN CIRCUMSCRIBED QUADRI ATERAL OF REFERENCE DATA | DATA ID, AREA, DATA QUANTITY |
| ... | ... | ... | ... | ... | ... |

FIG. 3C

331

| ID | DETECTION TARGET | COORDINATES | NUMERAL VALUE | MAXIMUM WIDTH | TOTAL EXTENSION/ CONTOUR LENGTH | AREA |
|---|---|---|---|---|---|---|
| C001 | CRACK | (Xc001_1,Yc001_1),•••, (Xc001_n,Yc001_n) | 0.5mm, ••• ,0.2mm | 0.8mm | 0.5m | 0.01m^2 |
| C002 | CRACK | (Xc002_1,Yc002_1),•••,(Xc002_m,Yc002_m) | 0.3mm, ••• ,0.1mm | 0.4mm | 0.4m | 0.01m^2 |
| D001 | CHALK-ING | (Xd001_1,Yd001_1),•••, (Xd001_p,Yd001_p) | 1.2mm, ••• ,0.8mm | 0.3mm | 0.9m | 0.03m^2 |
| T001 | REBAR EXPOSURE | (Xt001_1,Yt001_1) ,•••, (Xt001_q,Yt001_q) | 7.0mm, ••• ,2.5mm | 7.3mm | 1.5m | 0.25m^2 |
| ⋮ | ⋮ | ⋮ | ⋮ | ⋮ | ⋮ | ⋮ |
| Cxxx | CRACK | (Xcxxx_1,Ycxxx_1) ,•••, (Xcxxx_r,Ycxxx_r) | 0.1mm, ••• ,0.2mm | 0.6mm | 0.7m | 0.02m^2 |

FIG. 7A

701

| COMBINATION ID | CONFIRMATION TARGET | REFERENCE TARGET | REMARKS |
|---|---|---|---|
| Id71 | CRACK | CHALKING | |
| Id72 | FLAKING | REBAR EXPOSURE | |
| Id73 | REBAR EXPOSURE | FLAKING | |
| Id74 | EFFLORESCENCE | CRACK | |
| Id75 | REBAR EXPOSURE | FLAKING | FLAKING OF 0.1m^22 OR MORE |
| ... | ... | ... | |

FIG. 7B

711

| COMBINATION ID | CONFIRMATION TARGET | REFERENCE TARGET | REMARKS |
|---|---|---|---|
| Id71 | CRACK | CHALKING | |

FIG. 7C

721

| COMBINATION ID | CONFIRMATION TARGET | REFERENCE TARGET | REMARKS |
|---|---|---|---|
| Id73 | REBAR EXPOSURE | FLAKING | |
| Id75 | REBAR EXPOSURE | FLAKING | FLAKING OF 0.1m^2 OR MORE |

801

| ID | CONFIRMATION TARGET | REFERENCE TARGET |
|---|---|---|
| Id81 | CRACK | CHALKING |

821

| ID | CONFIRMATION TARGET | REFERENCE TARGET | REMARKS |
|---|---|---|---|
| Id82 | CRACK | CHALKING | CHALKING OF 0.01mm OR MORE |

FIG. 9A
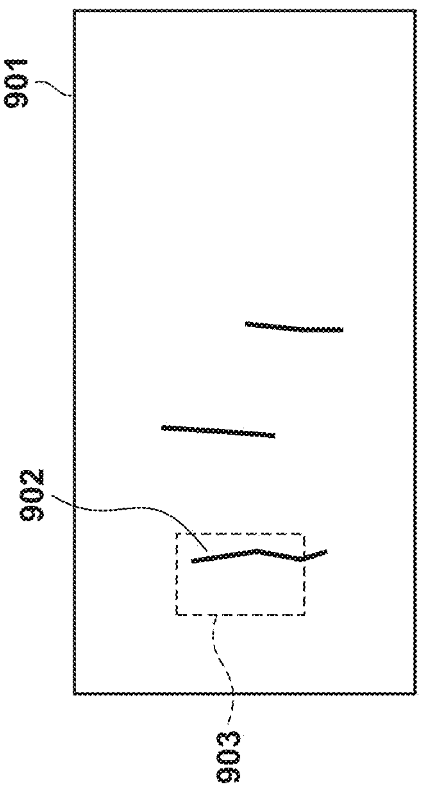
FIG. 9B
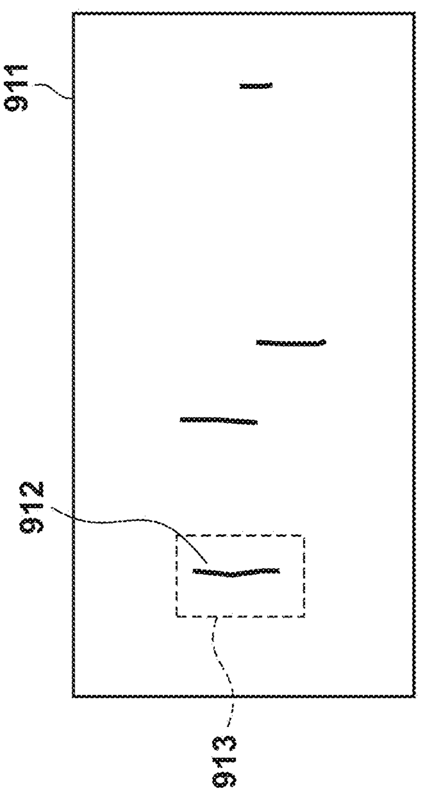
FIG. 9C
921
| ANALYSIS ID | REFERENCE DATA | ANALYSIS RANGE COORDINATES | DETECTION DATA (ANALYSIS RESULT) | DETECTION EXTENSION (ANALYSIS RESULT) | DETECTION DATA QUANTITY (ANALYSIS RESULT) |
|---|---|---|---|---|---|
| ana001 | 912 | 921((x1, y1) ···· (x4,y4)) | 902 | 0.05m^2 | 1 |

1011

| COMBINATION ID | CONFIRMATION TARGET | REFERENCE TARGET | ANALYSIS CONDITION (REFERENCE DATA) | ANALYSIS CONDITION (ANALYSIS RANGE) | ANALYSIS CONDITION (OUTPUT ITEM) |
|---|---|---|---|---|---|
| Id 101 | FLAKING | CRACK | CLOSURE CRACK | WITHIN CIRCUMSCRIBED QUADRILATERAL OF REFERENCE DATA | DATA ID, AREA, DATA QUANTITY |

FIG. 11A

1101

| ANALYSIS ID | REFERENCE DATA | ANALYSIS RANGE COORDINATES | DETECTION DATA (ANALYSIS RESULT) | DETECTION AREA (ANALYSIS RESULT) | DETECTION DATA QUANTITY (ANALYSIS RESULT) |
|---|---|---|---|---|---|
| ana011 | D011 | ((x11, y11), ..., (x1p,y1p)) | – | 0.0m^2 | 0 |
| ana012 | D012 | ((x21, y21), ..., (x2p,y2p)) | C012 | 0.08m^2 | 1 |
| ana013 | D013 | ((x31, y31), ..., (x3p,y3p)) | C013 | 0.1m^2 | 1 |
| ana014 | D014 | ((x41, y41), ..., (x4p,y4p)) | C011, C014 | 0.1m^2 | 2 |

FIG. 11B

1111

| ANALYSIS ID | REFERENCE DATA | ANALYSIS RANGE COORDINATES | DETECTION DATA (ANALYSIS RESULT) | DETECTION AREA (ANALYSIS RESULT) | DETECTION DATA QUANTITY (ANALYSIS RESULT) |
|---|---|---|---|---|---|
| ana011 | D011 | ((x11, y11), ..., (x1p,y1p)) | – | 0.0m^2 | 0 |

INFORMATION PROCESSING APPARATUS, INFORMATION PROCESSING METHOD, AND NON-TRANSITORY COMPUTER-READABLE STORAGE MEDIUM

BACKGROUND OF THE INVENTION

Field of the Invention

The present invention relates to an information processing apparatus, an information processing method, and a non-transitory computer-readable storage medium.

Description of the Related Art

In inspection of concrete structures such as bridges and tunnels, image inspection using images obtained by capturing wall surfaces of the structures is performed. In this image inspection, damage including a crack on a wall surface is detected using an image recognition technology such as machine learning. Since a detection result includes detection omission in which damage is not detected, an inspection worker performs confirmation work of the detection result. The confirmation work of the detection result takes time and effort. Japanese Patent No. 7156527 discloses a technology of detecting damage for each detection point from a road surface image and discriminating an image position having a high possibility of erroneous detection. Use of the technology of Japanese Patent No. 7156527 can efficiently confirm and correct an erroneous detection result included in a detection result. Japanese Patent No. 5645730 discloses a technology of detecting a closure crack.

However, in the known technologies, since a detection target such as damage is detected alone, it has been difficult to reduce detection omission.

SUMMARY OF THE INVENTION

According to one aspect of the present disclosure, there is provided an information processing apparatus comprising: one or more processors; and one or more memories including instructions that, when executed by the one or more processors, cause the information processing apparatus to: acquire an image obtained by capturing a structure in which a detection target exists, execute first detection data acquisition processing of acquiring first detection data that is data related to a plurality of detection targets detected from the image, acquire combination information related to a combination of a first detection target included in the plurality of detection targets and a second detection target associated with the first detection target, and analyze the first detection target of the first detection data based on the second detection target combined with the first detection target indicated by the combination information, and generate an analysis result.

According to another aspect of the present disclosure, there is provided an information processing method comprising: acquiring an image obtained by capturing a structure in which a detection target exists; acquiring first detection data that is data related to a plurality of detection targets detected from the image; acquiring combination information related to a combination of a first detection target included in the plurality of detection targets and a second detection target associated with the first detection target; and analyzing the first detection target of the first detection data based on the second detection target combined with the first detection target indicated by the combination information, and generating an analysis result.

According to another aspect of the present disclosure, there is provided a non-transitory computer-readable storage medium storing a computer program that, when read and executed by a computer, causes the computer to function as an image acquisition unit that acquires an image obtained by capturing a structure in which a detection target exists, a first detection data acquisition unit that acquires first detection data that is data related to a plurality of detection targets detected from the image, a combination information acquisition unit that acquires combination information related to a combination of a first detection target included in the plurality of detection targets and a second detection target associated with the first detection target, and an analysis unit that analyzes the first detection target of the first detection data based on the second detection target combined with the first detection target indicated by the combination information, and generates an analysis result.

Further features of the present invention will become apparent from the following description of exemplary embodiments (with reference to the attached drawings).

BRIEF DESCRIPTION OF THE DRAWINGS

FIG. 2A is a view describing combination information of detection targets existing on a wall surface of a bridge.

FIG. 2B is a view describing combination information of detection targets provided with a remarks column.

FIG. 2C is a view describing combination information of detection targets associated with analysis conditions.

FIG. 3C is a view showing an example of a detection data table indicating a data structure of detection data.

FIG. 7A is a view describing an example of combination information having a high relatedness among detection targets occurring on a concrete wall surface of a bridge.

FIG. 7B is a view of combination information acquired in a case where a first detection target is a crack.

FIG. 7C is a view of combination information acquired from combination information with rebar exposure as a first detection target.

FIG. 9A is a view describing an example of first detection data of an analysis target.

FIG. 9B is a view describing an example of second detection data for setting an analysis range.

FIG. 9C is a view describing an example of an analysis result.

FIG. 11A is a view describing an example of an analysis result for determining a noted position obtained in S405.

FIG. 11B is a view describing an example of an analysis result for determining a noted position that satisfies Formula 1 among the analysis results.

DESCRIPTION OF THE EMBODIMENTS

Figure 1A:
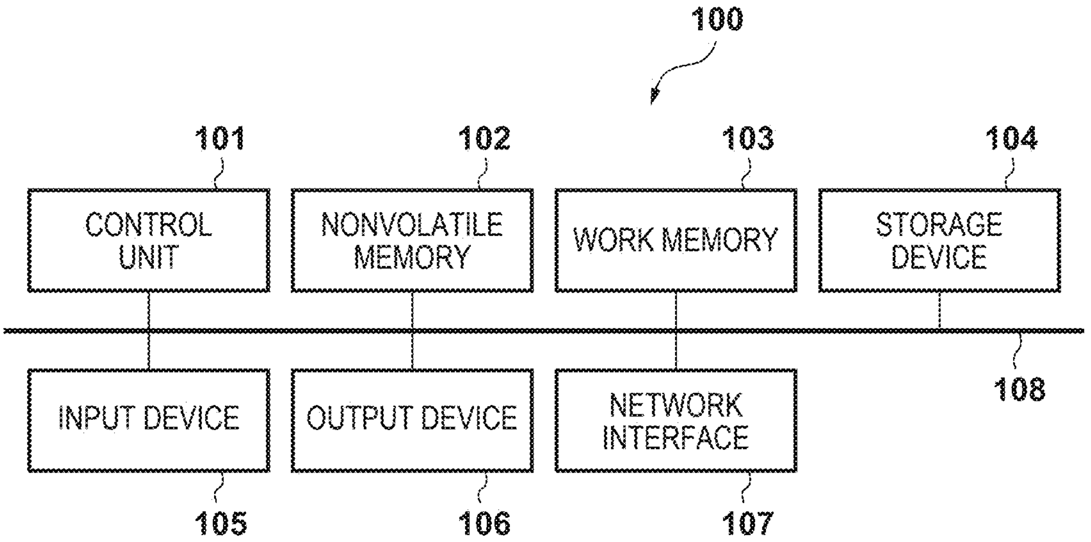
FIG. 1A is a block diagram illustrating a hardware configuration of an information processing apparatus of a first embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

Hereinafter, embodiments in which an information processing apparatus of the present invention is applied to a computer apparatus used for inspection of an infrastructure structure such as a concrete structure will be described. In the first embodiment, an example will be described in which a computer apparatus operates as an information processing apparatus, and, when displaying a detection result in which a detection target is detected from an image obtained by capturing an inspection target and the image, can display an image position periphery where there is a high possibility that the detection target exists.

In the present embodiment, the "inspection target" is a structure made of concrete or the like that is a target to be inspected, such as a limited-access road, a bridge, a tunnel, and a dam. The information processing apparatus performs detection processing of detecting presence or absence and a state of a detection target such as a crack by using an image obtained by a user capturing a structure of an inspection target. For example, in a case of a concrete structure, the "detection target" is a crack, chalking, creep, or flaking of concrete. The "detection target" includes, in addition, efflorescence, rebar exposure, rust, water leakage, water dripping, corrosion, damage (defect), cold joint, deposits, and honeycomb.

<Hardware Configuration>

A hardware configuration of the information processing apparatus of the first embodiment will be described with reference to FIG. 1A. FIG. 1A is a block diagram illustrating the hardware configuration of an information processing apparatus 100 of the first embodiment. In the first embodiment, a computer apparatus operates as the information processing apparatus 100. Note that the processing of the information processing apparatus of the present embodiment may be implemented by a single computer apparatus, or may be implemented by distributing each function to a plurality of computer apparatuses as necessary. The plurality of computer apparatuses are connected to one another so as to be able to communicate.

The information processing apparatus 100 includes a control unit 101, a nonvolatile memory 102, a work memory 103, a storage device 104, an input device 105, an output device 106, a network interface 107, and a system bus 108.

The control unit 101 includes an arithmetic processing processor such as a central processing unit (CPU) or a micro processing unit (MPU) that integrally controls the entire information processing apparatus 100. The control unit 101 may include an arithmetic processing processor such as a graphics processing unit (GPU) or a quantum processing unit (QPU) in addition to or in place of the CPU and the like.

The nonvolatile memory 102 is a read only memory (ROM) that stores a program to be executed by the processor of the control unit 101 and parameters necessary for executing the program. Here, the program is a program for executing processing of each embodiment described later. Specifically, the nonvolatile memory 102 stores an operating system (OS) that is basic software executed by the control unit 101, and an application that implements an application function in cooperation with this OS.

In the present embodiment, the nonvolatile memory 102 stores an application for the information processing apparatus 100 to implement control processing. The control processing of the information processing apparatus 100 of the present embodiment is implemented by reading software provided by an application. It is assumed that the application includes software for using basic functions of the OS installed in the information processing apparatus 100. The OS of the information processing apparatus 100 may include software for implementing the control processing in the present embodiment.

The work memory 103 is a random access memory (RAM) that temporarily stores programs and data supplied from an external device or the like. The work memory 103 holds data obtained by executing control processing in FIG. 4 described later.

The storage device 104 includes a memory card including a semiconductor memory and a magnetic disk, a solid state drive (SSD), and a hard disk. The storage device 104 includes a storage medium including a disk drive that reads/writes data from/to an optical disk such as a DVD or a Blue-ray Disc. The storage device 104 may be an internal device built in the information processing apparatus 100, or may be an external device detachably connected to the information processing apparatus 100.

The input device 105 is an operation member such as a mouse, a keyboard, or a touchscreen that receives a user operation. The input device 105 outputs an operation instruction received from a user to the control unit 101.

The output device 106 is an example of a display unit, and is a display apparatus such as a display and a monitor including a liquid crystal display (LCD) and organic electro luminescence (EL), and displays data retained by the information processing apparatus 100 and data supplied from an external device.

The network interface 107 is connected to a network such as the Internet and a local area network (LAN) so as to be able to communicate thereover.

The system bus 108 connects the control unit 101, the nonvolatile memory 102, the work memory 103, the storage device 104, the input device 105, the output device 106, and the network interface 107 of the information processing apparatus 100 so as to be able to exchange data. The system bus 108 includes an address bus, a data bus, and a control bus.

<Functional Block>

Figure 1B:
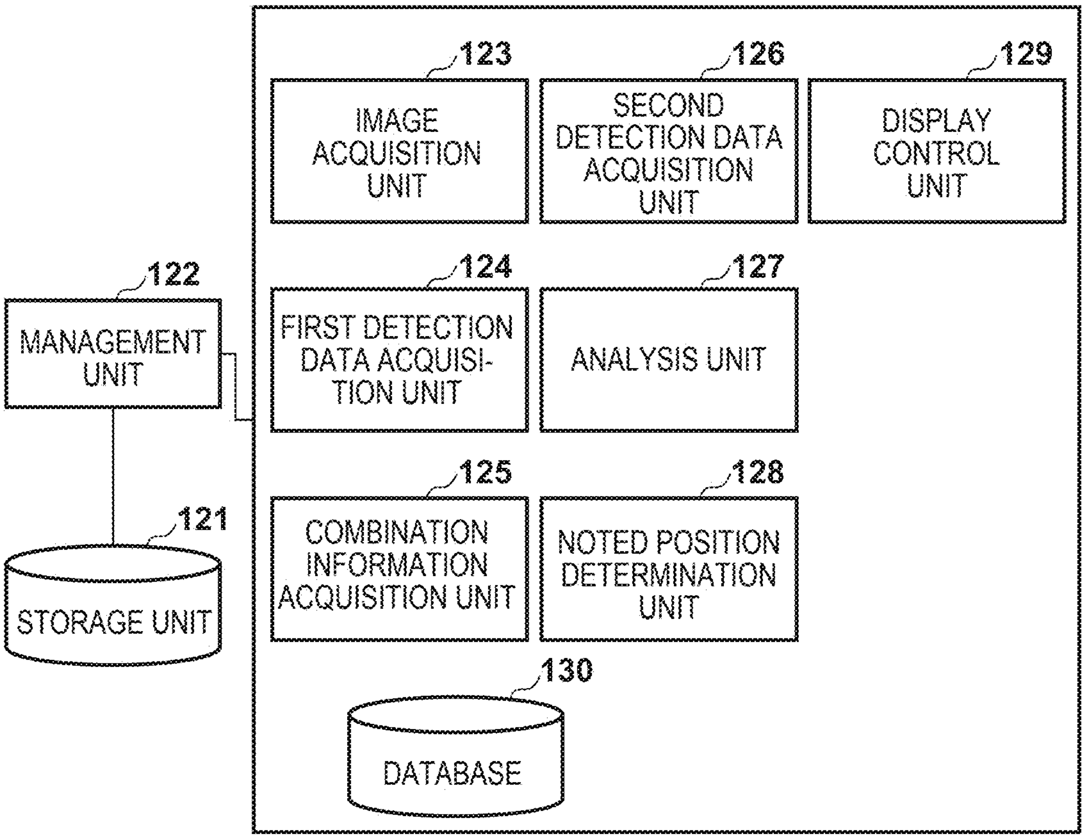
FIG. 1B is a functional block diagram of the information processing apparatus of the first embodiment.

Next, a functional block of the information processing apparatus 100 of the first embodiment will be described with reference to FIG. 1B. FIG. 1B is a functional block diagram of the information processing apparatus 100 of the first embodiment. The information processing apparatus 100 includes a storage unit 121, a management unit 122, an image acquisition unit 123, a first detection data acquisition unit 124, a combination information acquisition unit 125, a second detection data acquisition unit 126, an analysis unit 127, a noted position determination unit 128, a display control unit 129, and a database 130. Each function of the information processing apparatus 100 is configured by hardware and/or software. For example, the information processing apparatus 100 may implement each function or a part of the functions by the control unit 101 reading and developing, into the work memory 103, a program and parameters stored in the nonvolatile memory 102. Each functional unit may include one or a plurality of computer apparatuses or server apparatuses and may be configured as a system connected via a network. In a case where each functional unit illustrated in FIG. 1B is configured by hardware in place of being implemented by software, a circuit configuration corresponding to each functional unit in FIG. 1B may be included.

The management unit 122 performs management such as registration, deletion, acquisition, and update of data of a processing target stored in the storage unit 121, the data including image data that is data of an image such as a structure and detection data.

The image acquisition unit 123 acquires image data of the processing target from the storage unit 121 via the management unit 122.

The first detection data acquisition unit 124 acquires first detection data regarding a first detection target. The first detection target includes a crack, chalking, creep, flaking, rebar exposure, efflorescence, water leakage of concrete.

The combination information acquisition unit 125 performs processing of acquiring combination information of the detection target stored in the database 130.

The second detection data acquisition unit 126 acquires second detection data regarding a second detection target having a high relatedness with the first detection target based on the combination information from the storage unit 121 via the management unit 122. The second detection target is any included in the first detection target, and is, for example, chalking, rebar exposure, flaking, cracking, and the like.

The analysis unit 127 analyzes the first detection target of the first detection data based on the second detection target combined with the first detection target indicated by the combination information. Specifically, the analysis unit 127 sets an analysis range to the first detection data based on the second detection data related to the second detection target, and analyzes the first detection target combined with the second detection target within the analysis range of the first detection data and generates an analysis result.

The noted position determination unit 128 determines a noted position on an image based on an analysis result.

The display control unit 129 creates and outputs, to the output device 106, display data that is data of a display screen using a selected image, the first detection data, the noted position, and the like, and causes the output device 106 to display the display screen.

Details of the processing and the functions of the image acquisition unit 123, the first detection data acquisition unit 124, the combination information acquisition unit 125, the second detection data acquisition unit 126, the analysis unit 127, the noted position determination unit 128, and the display control unit 129 will be described later.

<Description of Combination Information>

Combination information used for control processing of the information processing apparatus 100 of the present embodiment will be described with reference to FIG. 2. FIG. 2 is an example of a table indicating the combination information. The combination information is information indicating a combination of detection targets that are detection targets having a high possibility of existing in the vicinity of an identical position (i.e., having a high relatedness) among the detection targets including a crack present on a wall surface of the inspection target. In the present embodiment, an image position at which there is a high possibility that the detection target exists is obtained using the combination information, and is utilized for detection result confirmation work. The combination information is stored in the database 130 in advance. The combination information acquisition unit 125 acquires, from the database 130, and uses combination information. The combination information stored in the database 130 may be any combination information. The database 130 may be stored in an external storage device such as a server connected via a network.

For example, in close visual inspection of a site, an inspection worker sometimes performs work of marking chalking in the vicinity of a crack occurring on a wall surface of the inspection target. Based on this finding, the combination of the crack and the chalking can be one piece of the combination information stored in the database 130. When the wall surface of the structure of the inspection target deteriorates, the surface may be peeled off to cause flaking. When this deterioration progresses, the rebar inside the inspection target may be exposed around the flaking. Based on this finding, the combination of the flaking and the rebar exposure can also be one piece of the combination information stored in the database 130.

FIG. 2A illustrates combination information 201 of the detection target existing on a wall surface of a bridge as an example of combination information. A combination ID of the combination information 201 is identification information for identifying a plurality of pieces of combination information. In the combination information 201, combinations of detection targets in which a confirmation target column and a reference target column having a high relatedness are indicated. The detection target of the reference target column is a target that has a high possibility of existing around the detection target of the confirmation target column. For example, the detection target of the confirmation target column is the first detection target, and the detection target of the reference target column is the second detection target. In this manner, storing, into the database 130, combination information in the table format is one implementation method.

In the combination information in the present embodiment, there is a case where it is desired to limit to some detection targets. For example, it is a case where all cracks and chalking having a certain length or more are set as combination information. In such a case, it is possible to cope with the case by providing a remarks column as in combination information 211 of FIG. 2B and filling in a narrowing condition of the detection target. Analysis conditions in the analysis unit 127 may be associated as in combination information 221 in FIG. 2C. In this manner, any information regarding analysis processing can be associated with the combination information. The analysis processing of the analysis unit 127 will be described later.

<Description of Image and Detection Data>

Next, an image and detection data used for control processing of the information processing apparatus 100 of the present embodiment will be described with reference to FIG. 3. In image inspection, an image obtained by capturing a wall surface of a structure may be managed in association with a drawing.

Figure 3A:
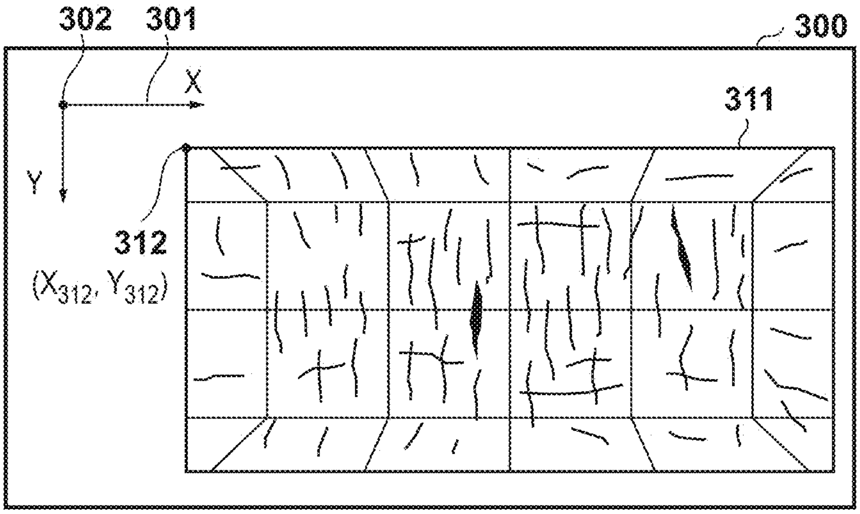
FIG. 3A is a view of a state in which an image obtained by capturing a wall surface of a bridge is pasted to a drawing.

FIG. 3A illustrates a state in which an image 311 obtained by capturing a wall surface of a bridge is pasted to a drawing 300 as an example of an infrastructure structure. The drawing 300 has a drawing coordinate axis 301 with a point 302 as an origin. The position of the image on the drawing is defined by the vertex coordinates at the upper left of the image. For example, the coordinates of the image 311 are the position of a vertex 312 ($X_{312}$, $Y_{312}$). The image is stored in the storage unit 121 together with coordinate information. In the present embodiment, the image used in the image inspection of the infrastructure structure is large in size because the image is photographed with high resolution (e.g., 1 mm per pixel) so that a fine crack and the like can be confirmed. For example, the image 311 in FIG. 3A is an image obtained by capturing a deck of a bridge of 20 m×10 m. In a case where the image resolution is 1.0 mm per pixel (1.0 mm/pixel), the image size of the image 311 is 20,000 pixels×10,000 pixels. In the image 311 photographed with high resolution, there are many detection targets of various sizes such as a crack, chalking, rebar exposure, corrosion, water leakage, and efflorescence.

However, since it is difficult to express all detection targets on a paper surface, the detection targets displayed on the paper surface are limited to some of them. The detection data is information in which a result of detecting a crack or the like occurring on a concrete wall surface from an image by AI using machine learning, deep learning, or the like, or an input result by a human is recorded. Since the detection data may contain a detection error by AI and an input error by a human, detection omission can occur.

Figure 3B:
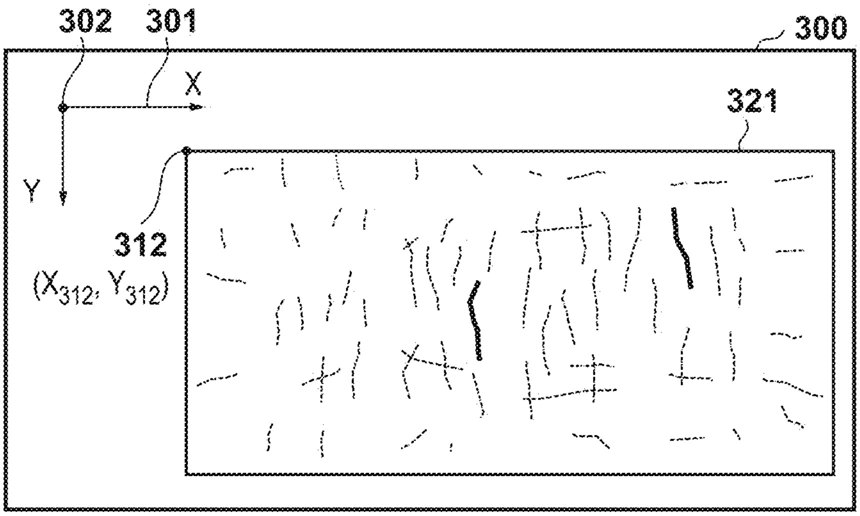
FIG. 3B is a view illustrating a state in which detection data corresponding to an image is pasted at the same position as the image in the drawing.

An object of the present embodiment is to find this detection omission. Description of the present embodiment assumes that detection data is managed in association with the drawings. FIG. 3B illustrates a state in which detection data 321 corresponding to the image 311 is pasted to the drawing 300 at the same position as in the image 311. The detection data 321 includes a large number of pieces of detection data including a detection target that is not displayed on the paper surface.

The position on the drawing of each of detection data in the detection data 321 is defined by pixel coordinates constituting the detection data. FIG. 3C illustrates an example of a detection data table 331 indicating the data structure of the detection data. In the detection data table 331, a coordinate column is an attribute value representing a plurality of coordinates constituting the detection data. For example, it is indicated that a crack C001 is represented by continuous pixels including n points of (Xc001_1, Yc001_1) to (Xc001_n, Yc001_n). In this manner, the present embodiment assumes that the detection data is expressed by pixels. The detection data may be expressed by vector data such as a polyline and a curve including a plurality of points. When detection data is expressed by vector data, the data capacity decreases and the expression becomes simpler. Examples of detection data other than a crack include rebar exposure with the ID of T001. When rebar exposure is expressed by a polyline, the detection includes a region surrounded by the polyline. Note that the attribute information included in the detection data is not limited to the attribute information shown in the detection data table 331, and other attribute information may be held.

In the control processing of the present embodiment, the information processing apparatus 100 can also use an image and detection data managed in association with each other. By associating the image with the detection data, the information processing apparatus 100 can obtain the positional relationship between the detection data and the image without using the drawings.

<Control Processing>

Figure 4:
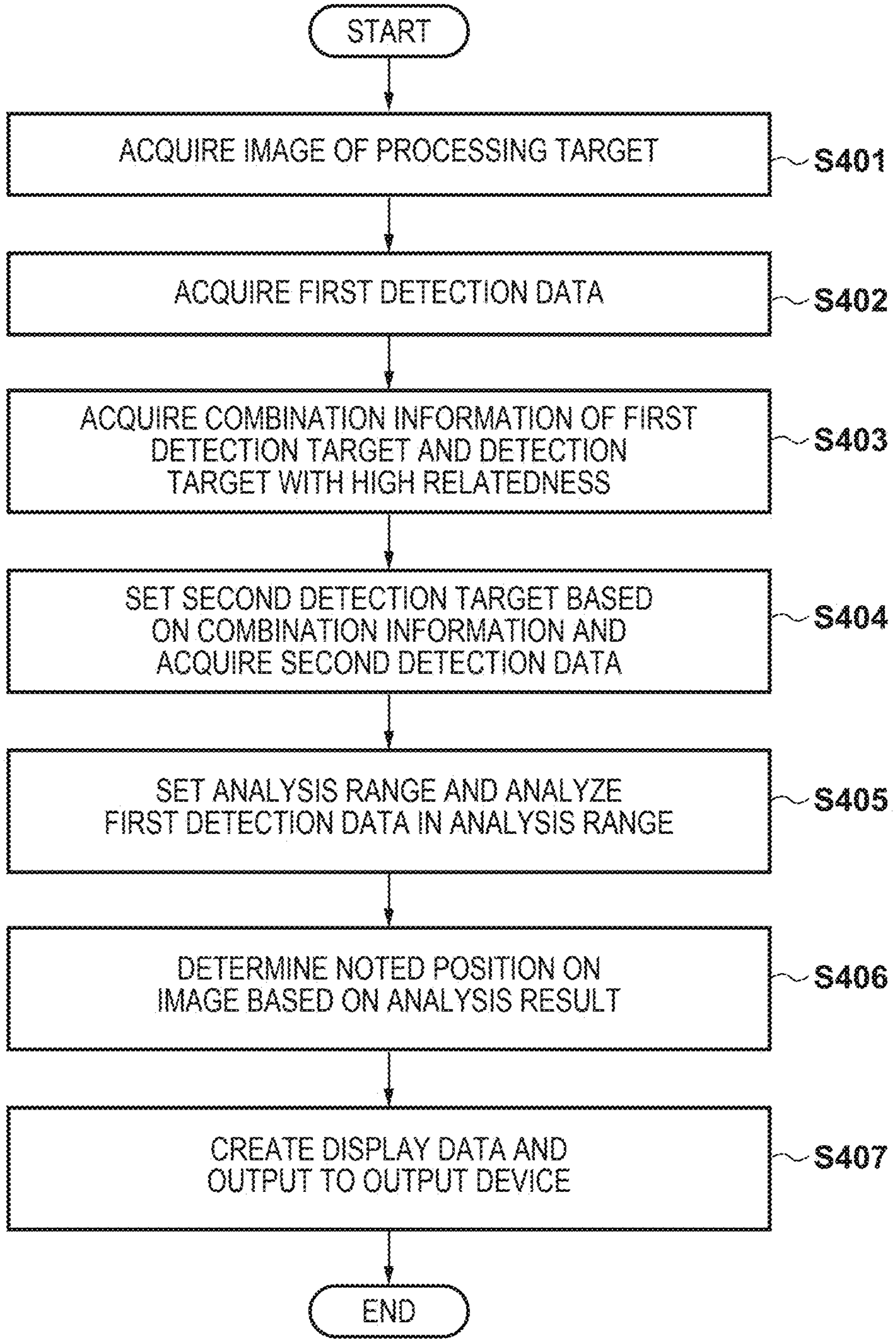
FIG. 4 is a flowchart showing control processing of the first embodiment.

The control processing of the information processing apparatus 100 in the present embodiment will be described with reference to FIG. 4. The processing of FIG. 4 is implemented by the control unit 101 of the information processing apparatus 100 illustrated in FIG. 1A developing, in the work memory 103, and executing a program stored in the nonvolatile memory 102, thereby controlling each component illustrated in FIG. 1A to operate as each functional unit illustrated in FIG. 1B. The processing of the present embodiment will be described below with reference to the flowchart of FIG. 4. Note that each process (step) will be described with S added to the head of the reference numeral.

<S401: Image Acquisition Processing>

Figure 5:
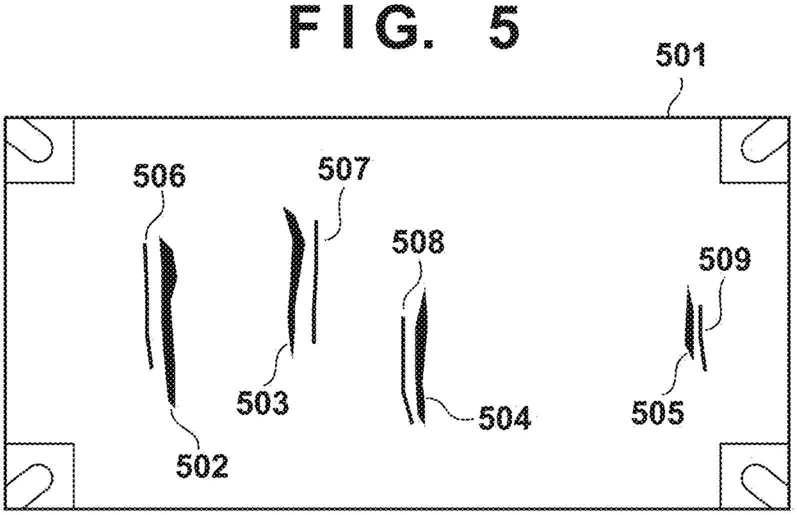
FIG. 5 is a view exemplifying an image obtained by capturing a surface of a structure.

The image acquisition unit 123 performs processing of acquiring an image of the processing target. In the present embodiment, an image stored in the storage unit 121 is acquired via the management unit 122. FIG. 5 illustrates an image 501 obtained by capturing a concrete wall surface of a bridge as an example of the inspection target. A crack 502, a crack 503, a crack 504, a crack 505, and chalking 506, chalking 507, chalking 508, and chalking 509 exist on the image 501. Note that the image 501 is an image photographed with high resolution and having a very large size. For this reason, although there are many other detection targets on the image 501, it is difficult to express all the detection targets on the drawing. Therefore, the detection targets displayed in the drawing are limited to some of them.

<S402: First Detection Data Acquisition Processing>

Figure 6:
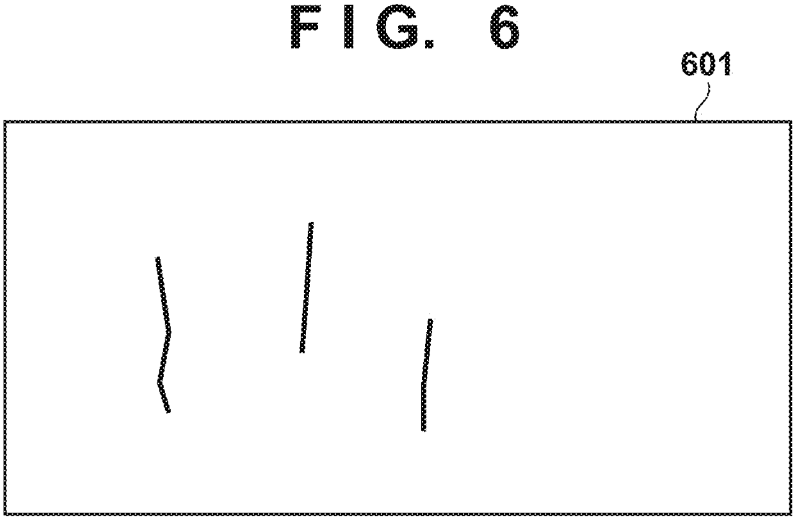
FIG. 6 is a view illustrating an example of first detection data.

The first detection data acquisition unit 124 acquires the first detection data of the first detection target corresponding to the image acquired in S401. FIG. 6 illustrates an example of first detection data 601 when a crack is a first detection target. In the first detection data acquisition processing, the first detection data acquisition unit 124 may use a method of displaying a screen for receiving a user's operation instruction and allowing the user to select the first detection data to be acquired. For example, as a method of allowing the user to select, the first detection data acquisition unit 124 displays a detection target list on the output device 106 and allows the user to select a detection target from the detection target list. Then, the first detection data acquisition unit 124 sets the selected detection target as the first detection target, and subsequently acquires the first detection data. As another method for allowing the user to select, the first detection data acquisition unit 124 may use a method of acquiring, in advance, and displaying, on the output device 106, detection data of a plurality of detection targets, and allowing the user to select some of the detection data as the first detection data. In this manner, the first detection data acquisition unit 124 may acquire the first detection data in response to the user's operation instruction.

<S403: Combination Information Acquisition Processing>

The combination information acquisition unit 125 acquires combination information indicating a combination of the first detection target and the second detection target having a high relatedness from the database 130. FIG. 7A shows an example of combination information 701 having a high relatedness among detection targets occurring on a concrete wall surface of a bridge. The combination information acquisition unit 125 acquires a row in which the value of the confirmation target column is the same as that of the first detection target in this combination information 701. As an example, FIG. 7B shows combination information 711 in which the combination ID acquired when the first detection target is a crack is "Id71". In this manner, the combination information acquisition unit 125 can acquire combination information of the second detection target having a high relatedness with the first detection target.

In the processing of S403, a plurality of pieces of combination information may be acquired. For example, FIG. 7C shows combination information 721 acquired from the combination information 701 with rebar exposure as the first detection target. In this case, the combination information acquisition unit 125 can cope with it by executing the processing in and after S404 by the number of rows of the combination information 721.

<S404: Second Detection Data Acquisition Processing>

The second detection data acquisition unit 126 performs processing of acquiring the second detection data of the second detection target set based on the combination information. In the present embodiment, the second detection data acquisition unit 126 sets the second detection target based on the combination information acquired in S403, and acquires the second detection data of the second detection target. This second detection data acquisition processing will be described with reference to FIG. 8.

Figures 8A, 8B, 8C:
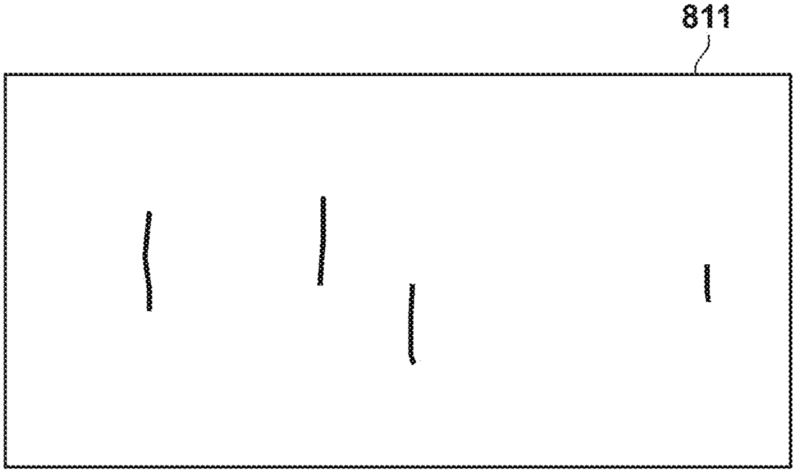
FIG. 8A is a view showing an example of combination information acquired in S403.
FIG. 8B is a view illustrating an example of second detection data.
FIG. 8C is a view showing an example of combination information including a narrowing condition of the second detection data.

FIG. 8A is an example of combination information 801 acquired in S403. With reference to the reference target column of this combination information 801, the second detection data acquisition unit 126 sets "chalking" as the second detection target. Then, the second detection data acquisition unit 126 acquires, as the second detection data, data obtained by detecting the chalking that is the second detection target on an image acquired by the image acquisition unit 123. FIG. 8B illustrates an example of second detection data 811. In this manner, the second detection data acquisition unit 126 can acquire the second detection data based on the combination information.

FIG. 8C shows an example of combination information 821 including a narrowing condition of the second detection data. As illustrated in FIG. 8C, there is a case where the combination information 821 acquired in the processing of S403 includes the narrowing condition of the second detection data. In this case, the second detection data acquisition unit 126 may acquire, as the second detection data, chalking data having an actual length of 0.01 m or more based on the remarks column of the combination information 821. In this manner, the second detection data acquisition unit 126 can narrow down the detection data to be acquired as the second detection data.

<S405: Analysis Processing>

In S405, the analysis unit 127 sets an analysis range and performs processing of analyzing the first detection data in the analysis range. The analysis processing in the present embodiment will be described with reference to FIG. 9. FIG. 9A illustrates the first detection data of an analysis target. FIG. 9B illustrates the second detection data for setting the analysis range. First detection data 901 of FIG. 9A and second detection data 911 of FIG. 9B are examples of data in which a crack and chalking are detected in the same image, and are associated with the same position on the drawing.

When performing the analysis processing, the analysis unit 127 first sets the analysis range. As a setting method of the analysis range, the analysis unit 127 may use the second detection data. Specifically, the analysis unit 127 selects one piece of chalking data 912 from the second detection data 911. Then, the analysis unit 127 sets a range 913 of a dotted line surrounding the chalking data 912. The size of the range 913 may be changed to any size as long as it is a range including coordinate information of the chalking data 912. For example, the analysis unit 127 can set the range surrounding the chalking data 912 as an initial range and expand the range by an any size in the X axis and Y axis directions in the drawing. Subsequently, the analysis unit 127 superimposes the range 913 on the first detection data 901. The analysis unit 127 sets the range 903 obtained by this superposition as an analysis range. In this manner, the analysis unit 127 can set the analysis range using the second detection data.

Next, the analysis unit 127 performs analysis processing on the first detection data included in the analysis range. Specifically, the analysis unit 127 selects crack data 902 included in the range 903 in the first detection data 901. Then, the analysis unit 127 calculates the number of pieces of selected crack data, the total extension of the selected crack data, and the like, as analysis processing for the crack data 902. FIG. 9C shows an example of an analysis result 921. A detection data column of the analysis result 921 is a column for identifying the crack data 902 in the analysis range. A detection extension column and a detection data quantity column indicate the total extension of crack data and the number of pieces of crack data, respectively, in the analysis range. The analysis result 921 includes a reference data column and an analysis range coordinate column as information regarding the analysis range. The reference data column indicates a column of identification information for identifying the chalking data 912 selected as a reference of the analysis range. The analysis range coordinate column indicates coordinate information on the drawing of the range 903. Thereafter, the analysis unit 127 selects one piece of chalking data different from the chalking data 912 from among the second detection data 911, and performs setting of the analysis range and analysis processing by a similar method. The analysis unit 127 can obtain a plurality of analysis results corresponding to respective chalking data by repeatedly executing this processing on all the chalking data of the second detection data 911.

Figures 10A, 10B:
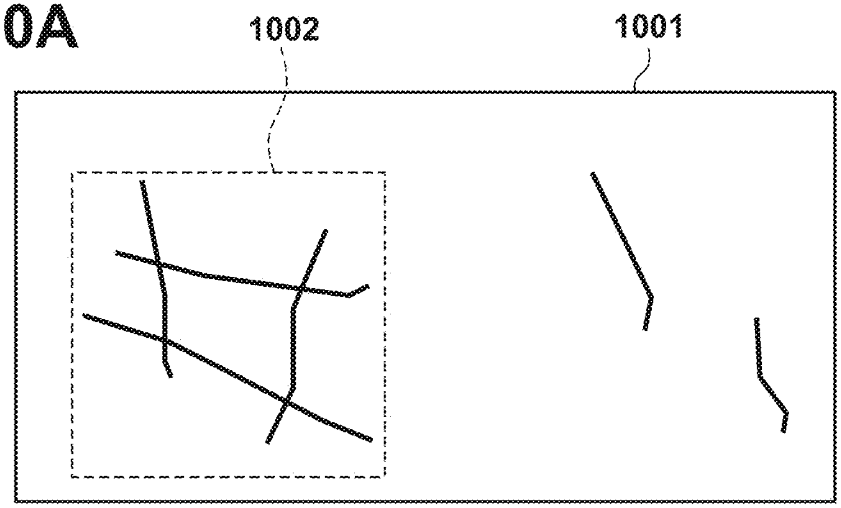
FIG. 10A is a view describing an example of second detection data when a crack is a second detection target.
FIG. 10B is a view describing another example of combination information associated with an analysis condition.

The analysis unit 127 may use another method as a setting method of the analysis range using the second detection data. FIG. 10A illustrates an example of second detection data 1001 when a crack is the second detection target. The analysis unit 127 may detect a closure crack based on the second detection data 1001, and set the analysis range by superimposing a range 1002 including the closure crack on the first detection data. The analysis unit 127 can use the technology of Japanese Patent No. 5645730, for example, as a method of detecting the closure crack. In this manner, the analysis unit 127 can also set the analysis range by analyzing the second detection data 1001.

The analysis unit 127 may use still another method as a setting method of the analysis range. For example, the analysis unit 127 may set an entire image of the processing target as one analysis range. The analysis unit 127 may divide the image of the processing target into rectangular ranges of a certain size, and set individual divided ranges as the analysis range. When setting the analysis range without using the second detection data, the analysis unit 127 may also perform, on the second detection data, processing similar to the analysis processing of the first detection data in the analysis range. Due to this, the noted position determination unit 128 can determine a noted position also using the analysis result of the second detection data in the processing of S406 described later.

As another analysis method, the analysis unit 127 can use a different analysis method for each piece of combination information. FIG. 10B illustrates an example of combination information 1011 associated with an analysis condition. The analysis unit 127 sets the analysis range based on a reference data column and an analysis range column of the combination information 1011, and outputs the description content of an output item column as an analysis result. As described with reference to FIG. 2C, the combination information associated with the analysis condition may be stored in the database 130 in advance. Due to this, the combination information acquisition unit 125 can acquire the combination information associated with the analysis condition in the processing of S403. Therefore, the analysis unit 127 can use a different analysis method for each piece of combination information.

<S406: Noted Position Determination Processing>

The noted position determination unit 128 performs processing of determining a noted position on an image based on an analysis result by the analysis unit 127. The noted position is, for example, a position within an analysis range, among the plurality of analysis ranges, in which the second detection target is detected but the first detection target associated with the second detection target is not detected. In other words, the noted position is a position within the analysis range having a high possibility of detection omission to which the user or the like should pay attention. Noted position determination processing will be described with reference to FIG. 11. FIG. 11A is an example of an analysis result 1101 obtained in S405. First, the noted position determination unit 128 performs processing of narrowing down the analysis result used for the determination processing of the noted position from the analysis result 1101. Examples of the narrowing down method include a method in which the noted position determination unit 128 determines whether or not the detection data quantity in the analysis result is less than a reference value, and narrows down based on the determination result. Formula 1 illustrates an example of a determination formula.

[Equation 1][Equation 1]

$$D<D_c \quad \text{(Formula 1)}$$

In Formula 1, a parameter Dc is any constant, and a parameter D is the detection data quantity in the analysis result. Here, description of the present embodiment assumes that the parameter Dc is "1". Note that the parameter Dc may be the number of second detection data within the target analysis range, that is, the number of second detection targets detected within the analysis range. Due to this, a plurality of pieces of chalking are detected within the analysis range and it is possible to cope with a case where one of a plurality of corresponding cracks is not detected. The noted position determination unit 128 selects one analysis result from the analysis result 1101, substitutes the detection data quantity of the selected analysis result into Formula 1, and determines whether or not Formula 1 is satisfied. FIG. 11B illustrates an analysis result 1111 that satisfies Formula 1 of the analysis result 1101.

Next, the noted position determination unit 128 determines the noted position based on the analysis result 1111 after narrowing down. Methods of determining the noted position include a method of calculating barycentric coordinates of reference data D011, which is a reference of the analysis range, in the analysis result 1111 and setting the barycentric coordinates as the noted position. The reference data is a part of the second detection data and has coordinate information on the drawing. Therefore, the noted position determination unit 128 can calculate the barycentric coordinates on the drawing based on the reference data. As another method of determining the noted position, the noted position determination unit 128 may perform a method of calculating the center coordinates of the analysis range and setting the center coordinates as the noted position. In this manner, the noted position determination unit 128 can determine the noted position on the image based on the analysis result.

Although an example of using the detection data quantity has been described as a method of narrowing down the analysis result, the noted position determination unit 128 may use another method. For example, the noted position determination unit 128 may perform narrowing down based on a determination result as to whether or not the detection area in the analysis result is less than a reference value. In this case, using Formula 1 as it is, the noted position determination unit 128 may set the reference value of the detection area to the parameter Dc, and substitute the value of the detection area of the analysis result to the parameter D. In this manner, the noted position determination unit 128 can narrow down the analysis result by using any information regarding the analysis result.

The processing of narrowing down the analysis result of the noted position determination unit 128 can be omitted. In the present embodiment, the noted positions corresponding to all the analysis results can be obtained by omitting the narrowing down processing. Therefore, in display processing of S407 described later, it is possible to confirm, without fail, not only the image position where the possibility of detection omission is high but also the image position where the possibility that the detection target exists is high.

<S407: Display Processing>

In S407, the display control unit 129 performs processing of creating and outputting, to the output device 106, display data to be displayed as an image based on a partial image in the vicinity of the noted position. The output device 106 displays the display image based on the display data.

Figure 12A:
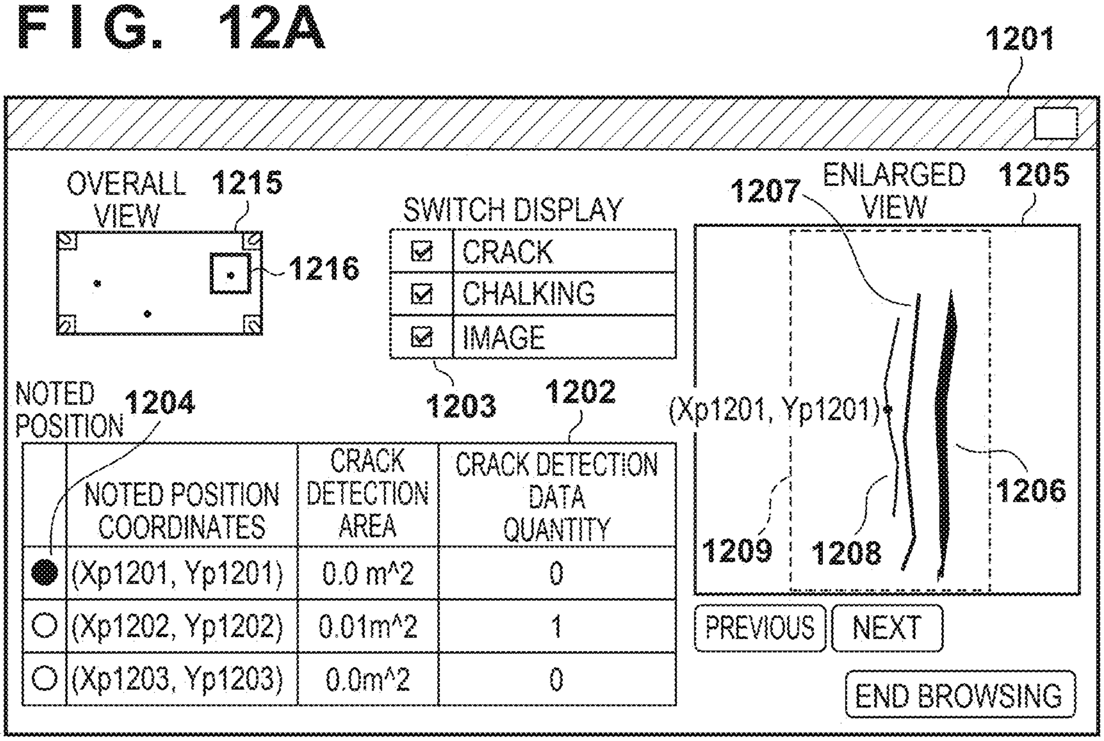
FIG. 12A is a view exemplifying a display screen displayed on an output device by display data created by a display control unit.

A display screen 1201 of FIG. 12A is an example of a screen displayed by the display data created by the display control unit 129. In the display screen 1201, the first detection target is a crack, and the second detection target is chalking. The user confirms a crack detection result with the display screen 1201. A noted position list 1202 on the display screen 1201 is a list of the noted positions obtained in the processing of S406.

In the present embodiment, the display control unit 129 displays, on the output device 106, an enlarged view 1205 of the vicinity of the noted position selected by the user in the noted position list 1202. The enlarged view 1205 is a view in which crack detection data and chalking detection data are superimposed on the partial image in the vicinity of a noted position 1204 having been selected. In this enlarged view 1205, there is chalking data 1208 corresponding to chalking 1207 on the image, but there is no crack data corresponding to a crack 1206 on the image. In this manner, the noted position indicates an image position where there is a high possibility of detection omission regarding the first detection target. Therefore, by utilizing the information of the noted position, the user can efficiently perform confirmation work of the detection result.

A range 1209 indicated by a dotted line is an analysis range regarding the analysis result used in the noted position determination processing. In this manner, by visualizing the analysis range, the display control unit 129 makes it easy for the user to understand the image range to be confirmed. By selecting the display target in display switching 1203, the user can individually switch between display and hide of each of detection data and each partial image included in the enlarged view 1205. The user can move or deform a thick frame 1216 of an overall view 1215 in response to various operations of the input device 105. Due to this, the display control unit 129 can freely switch the display range and the display position of the display image by the display data displayed as the enlarged view 1205.

Figure 12B:
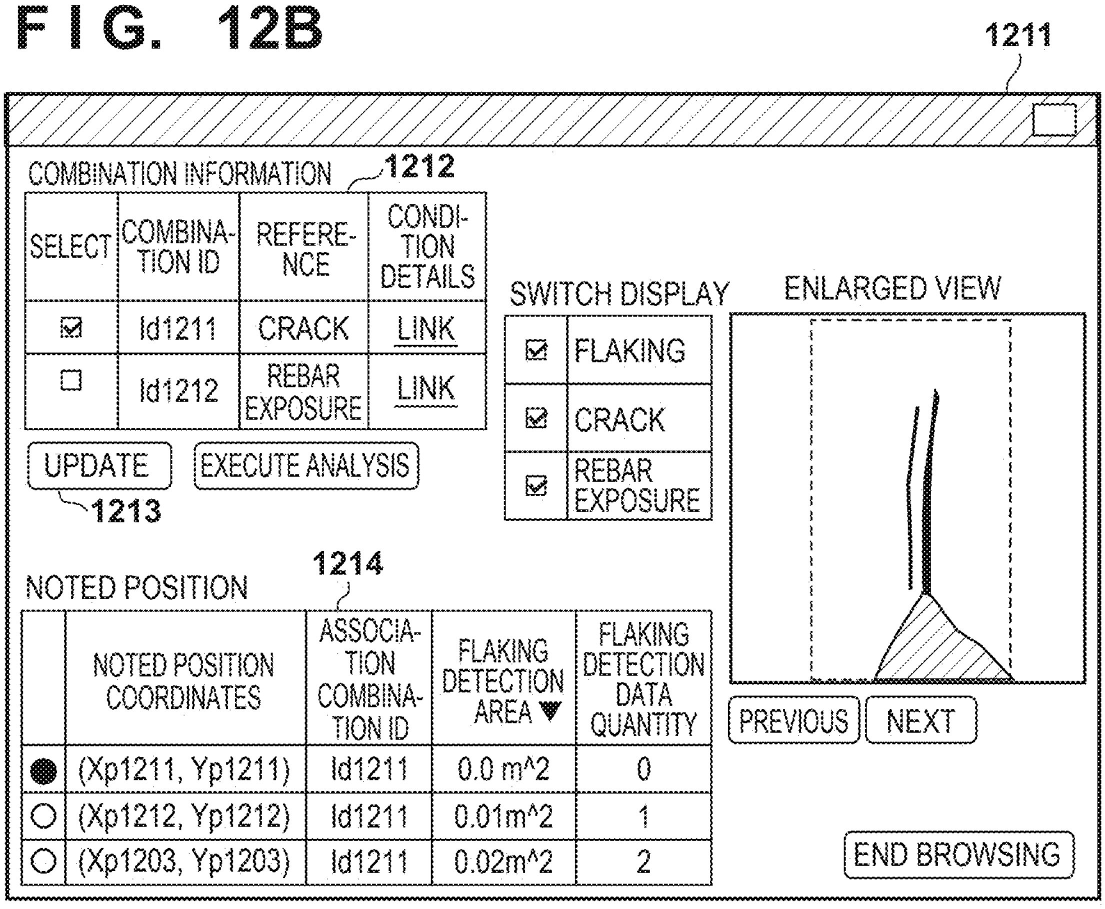
FIG. 12B is a view illustrating another example of the display screen displayed on the output device.

In the display processing of the display control unit 129, the combination information acquired in the processing of S403 can be displayed on the screen. A display screen 1211 of FIG. 12B is an example when the first detection target is flaking and a plurality of second detection targets (a crack and rebar exposure) exist. The user confirms the detection result of flaking on the display screen 1211. A combination information list 1212 on the display screen 1211 is the combination information acquired in S403. By displaying the combination information on the display screen 1211, the user can easily recognize the combination information used to obtain the noted position. The display control unit 129 may switch a noted position list 1214 based on the combination information. Specifically, when the user presses an update button 1213, the display control unit 129 switches the display of the noted position list 1214 in response to selection of the combination information list 1212. In this manner, the display control unit 129 may link selection information of the combination information list 1212 and display of the noted position list 1214.

The noted position list 1214 on the display screen 1211 indicates a state in which ascending order sorting of flaking detection areas is applied. In this manner, the display control unit 129 may change the arrangement order of the noted position list 1214. In a case where the number of noted positions is large, it takes time and effort for the user to confirm all the noted positions. Therefore, the user can efficiently confirm the noted position by the display control unit 129 provided with a narrowing function of narrowing down and displaying only the top five with a small number of flaking detection data in the noted position list.

In the processing of S407, the display control unit 129 may display the entire image including the noted position. After performing the noted position determination processing using the present embodiment on a large number of images, the display control unit 129 can display the entire image including the noted position in the processing of S407. In this manner, the display control unit 129 can pick up an image having a high possibility of including detection omission of the first detection target, whereby the user can efficiently narrow down an image to be confirmed.

Figure 13A:
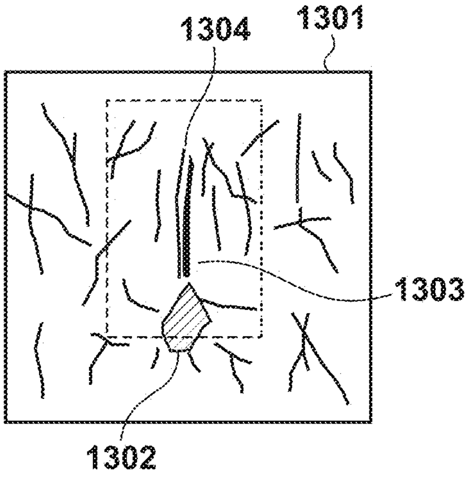
FIG. 13A is a view exemplifying a display image when flaking including a noted position is a first detection target and a crack having a maximum width of 1 mm or more is a second detection target.
Figure 13B:
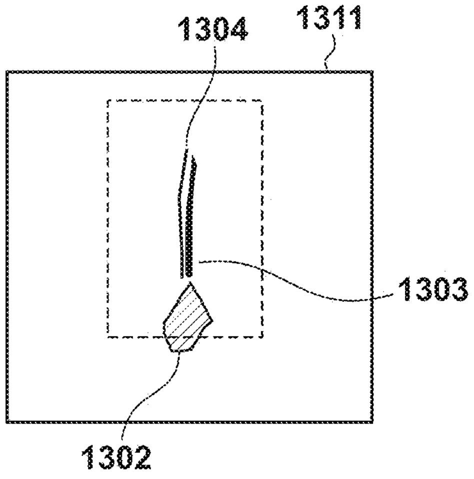
FIG. 13B is a view illustrating another example of a display image when flaking including a noted position is a first detection target and a crack having a maximum width of 1 mm or more is a second detection target.

In a case where there are a large number of detection results in the vicinity of the noted position, it is difficult for the user to browse an image in the vicinity of the noted position. In such a case, in the processing of S407, the display control unit 129 may display only the detection data regarding the analysis result used in the noted position determination processing and hide the other detection data. FIGS. 13A and 13B illustrate examples of a display image 1301 and a display image 1311, respectively, when flaking is the first detection target and a crack having a maximum width of 1 mm or more is the second detection target.

The display image 1301 indicates a state in which flaking detection data and crack detection data are superimposed on the image of the processing target. The image of the processing target of the display image 1301 includes a plurality of cracks other than flaking 1302 used in the noted position determination processing, a crack 1303 having a maximum width of 1 mm or more, and crack data 1304. The display image 1311 is different from the display image 1301 in displaying only the crack data 1304 regarding the noted position determination processing among the plurality of crack data. In the display image 1311, as compared with the display image 1301, the user can easily visually recognize the flaking 1302, the crack 1303, and the crack data 1304 on the image. In this manner, the display control unit 129 may display only detection data regarding the noted position determination processing and hide other detection data.

Modification Example of First Embodiment (Utilization of Correction Result)

In the first embodiment, the analysis unit 127 can also use detection data corrected by the user. Specifically, the first detection data acquisition unit 124 acquires a correction history of the first detection data from the storage unit 121 together with the first detection data of the first detection target. The first detection data acquisition unit 124 corrects the first detection data based on the correction history. In the subsequent analysis processing, the analysis unit 127 performs analysis processing using the corrected first detection data. The other processing is similar to that of the first embodiment. Since the noted position obtained in this manner indicates a position having a high possibility that detection omission occurs even after the user corrects the first detection data, it is desirable to confirm the noted position. Therefore, the first detection data acquisition unit 124 uses the correction history of the detection data, whereby the analysis unit 127 can determine the image position having a high possibility of detection omission.

Modification Example of First Embodiment (Utilization of User Operation History)

In the first embodiment, the information processing apparatus 100 can also utilize a user's operation history including a browsing history indicating browsing for the detection result. Specifically, the first detection data acquisition unit 124 acquires the detection data of the first detection target and a user browsing history of the processing target image. In the subsequent noted position determination processing, the noted position determination unit 128 may determine the noted position on the image based on the operation history including the browsing history. For example, the noted position determination unit 128 determines the noted position from the image range not browsed by the user. In this manner, by using the user operation history, the noted position determination unit 128 can determine, as the noted position, a position having a high possibility that detection omission by the user in the detection result confirmation work. Note that the timing of using a user's browsing history needs not be the noted position determination processing. For example, in the second detection data acquisition processing, the second detection data acquisition unit 126 may acquire the second detection data from a range not browsed by the user. In the analysis processing, the analysis unit 127 may exclude the range browsed by the user from the analysis range. In this manner, the information processing apparatus 100 can use the user's browsing history in various methods.

According to the first embodiment described above, the information processing apparatus 100 analyzes the first detection data indicating the result of detection of the first detection target from an image based on the combination information of the first detection target such as a crack and the second detection target such as chalking associated with the first detection target having a high possibility of existing around the first detection target. Due to this, the information processing apparatus 100 can suppress detection omission of the first detection target as compared with a case where the first detection target is detected and analyzed alone.

In the information processing apparatus 100, the display control unit 129 generates and outputs, to the output device 106, display data of a display image based on the analysis result of the first detection data, and displays the display image on the output device 106. Due to this, the information processing apparatus 100 can provide the user with a display image by an analysis result with less detection omission.

In the information processing apparatus 100, the second detection data acquisition unit 126 acquires the second detection data that is a detection result of the second detection target associated with the first detection target. Due to this, the information processing apparatus 100 can analyze the first detection data based on the second detection data, and thus, even in a case where the first detection target is not detected, it is possible to provide the user with useful information by detecting the second detection target.

In the information processing apparatus 100, the analysis unit 127 sets an analysis range in an image based on the second detection data, analyzes the first detection data in the analysis range, and generates an analysis result. Due to this, the information processing apparatus 100 can efficiently suppress detection omission of the first detection target while reducing the range to be analyzed and reducing the processing burden.

In the information processing apparatus 100, the noted position determination unit 128 determines the noted position within the analysis range. Due to this, the information processing apparatus 100 can reduce the range to which the user should pay attention, and thus the confirmation burden by the user can be reduced.

In the information processing apparatus 100, the display control unit 129 determines the noted position in the analysis range on the image in accordance with the combination information, and creates the display data of the display screen on which a partial image in the vicinity of the noted position and the first detection data of the detection target are superimposed. Due to this, the information processing apparatus 100 can generate a display screen by the partial image including the noted position having a high possibility of detection omission to which the user should pay attention. By displaying, on the output device, the display screen created by the display control unit 129, the information processing apparatus 100 can improve the efficiency of the confirmation work of the detection data by the user.

In the information processing apparatus 100, the display control unit 129 displays a display screen including combination information associated with the coordinates of the noted position. Due to this, the information processing apparatus 100 can provide the user with necessary information in detail.

In the information processing apparatus 100, the display control unit 129 includes, in the display screen, an enlarged view including the analysis range including the detection data. Due to this, the information processing apparatus 100 can provide the user with detection data to be noted among the detection data analyzed within the analysis range.

In the information processing apparatus 100, the first detection target is a crack and chalking, and the second detection target is chalking. Since the information processing apparatus 100 analyzes the first detection data based on the combination information in which the crack and the chalking are associated with each other, even in a case where the crack is not detected, if the chalking is detected, it is possible to determine the noted position in the analysis range of the first detection data, and therefore, it is possible to reduce detection omission of the crack.

Second Embodiment

In the first embodiment, an example of automatically determining the noted position using the combination information of the detection target has been described. In a case where there are a large number of pieces of combination information of detection targets, a large amount of calculation cost is required. Therefore, the information processing apparatus 100 of the second embodiment displays the combination information of a detection target on the screen in addition to an image of the processing target and the detection data, and receives selection of the combination information by the user. Then, the information processing apparatus 100 performs the noted position determination processing based on the combination information selected by the user. In this manner, the information processing apparatus 100 of the second embodiment can suppress the calculation cost by causing the user to select the combination information to be used for the noted position determination processing.

Figure 14:
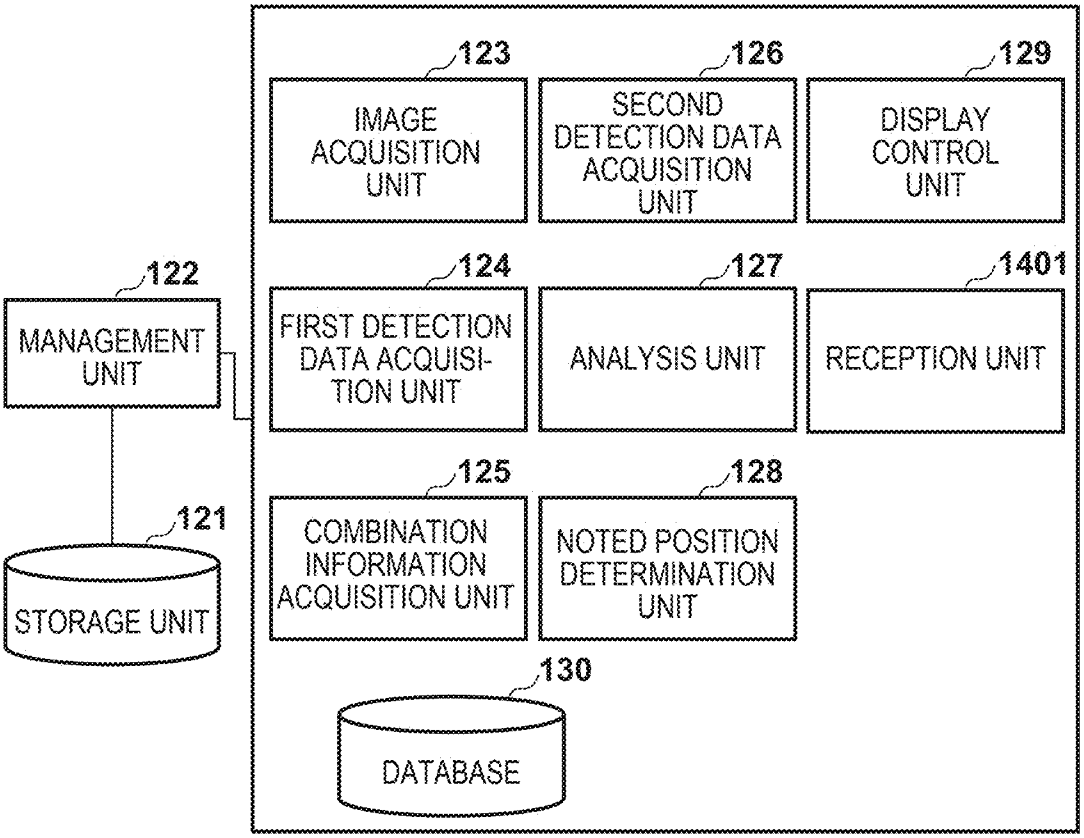
FIG. 14 is a functional block diagram of an information processing apparatus of a second embodiment.

Since the hardware configuration of the information processing apparatus 100 according to the second embodiment is similar to the configuration of the first embodiment illustrated in FIG. 1A, illustration and description thereof are omitted. FIG. 14 is a view illustrating an example of a functional block diagram of the information processing apparatus 100 according to the second embodiment. The functional configuration of FIG. 14 is different from the functional configuration illustrated in FIG. 1B of the first embodiment in that a reception unit 1401 is added. The reception unit 1401 is a functional unit of the control unit 101, and performs processing of receiving user selection for the combination information output to the output device 106.

Figure 15:
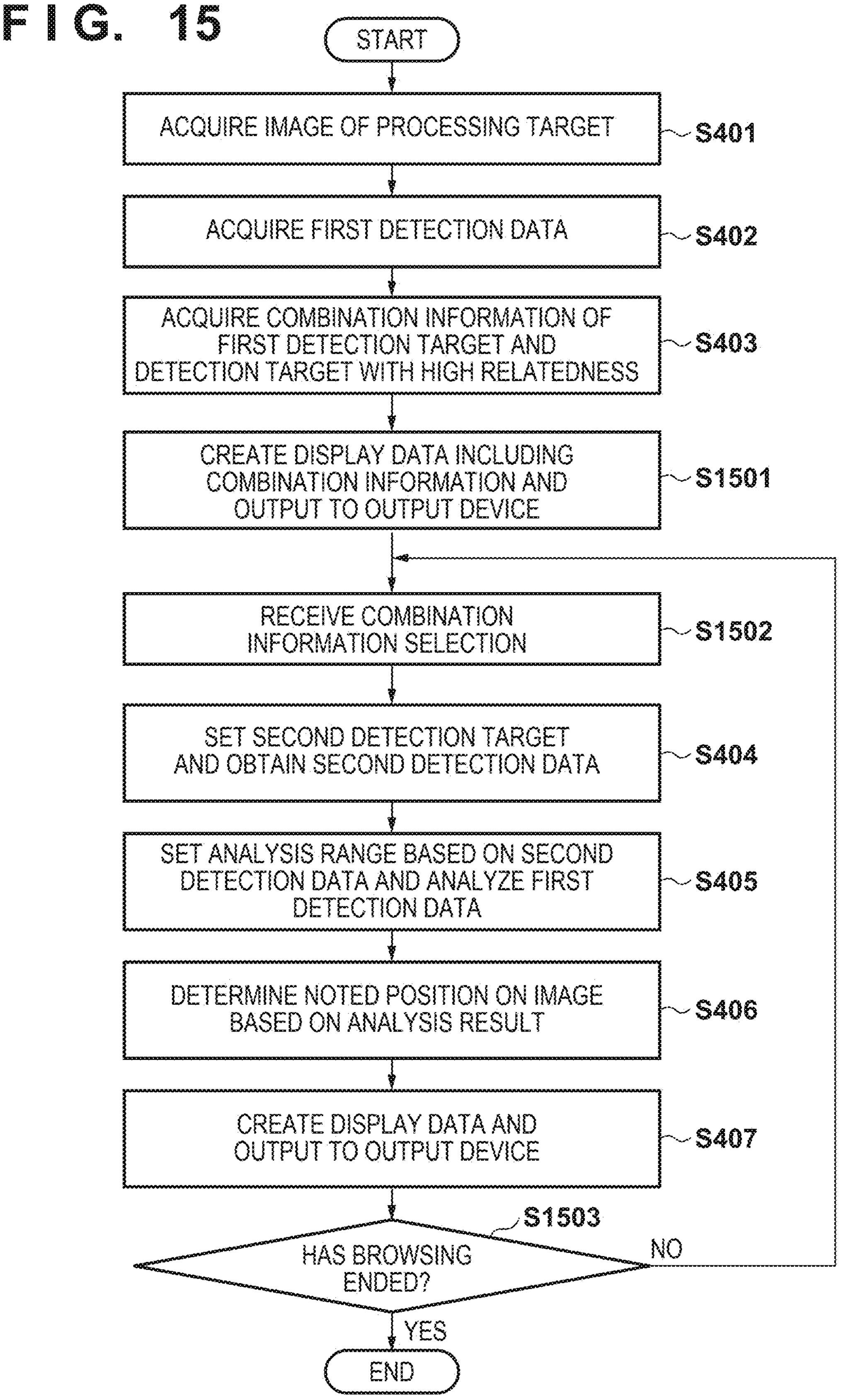
FIG. 15 is a flowchart explaining control processing of the second embodiment.

FIG. 15 is a flowchart showing a main flow of information processing executed by the information processing apparatus 100 according to the second embodiment. In the flowchart of FIG. 15, processing similar to that in the first embodiment is executed in steps denoted by the same numbers as those in the flowchart of FIG. 4 described in the first embodiment.

In the case of the second embodiment, after acquiring the combination information in S403, the information processing apparatus 100 proceeds to S1501. In the processing of S1501, the display control unit 129 creates display data including the combination information acquired in S403, and displays, on the output device 106, a display image by the display data. Thereafter, in S1502, the reception unit 1401 receives selection of the combination information from the user.

Thereafter, in S404, the second detection data acquisition unit 126 acquires the second detection data based on the selected combination information. Thereafter, through the analysis processing in S405 and the noted position determination processing in S406, the display control unit 129 creates and outputs, to the output device 106, display data in S407. In S1503, when determining that the browsing has ended, the information processing apparatus 100 ends the processing, and otherwise, executes the processing of S1502 again. An outline of the processing of S1501 and S1502 will be described below.

<S1501: Output Processing of Display Data Including Combination Information>

Figure 16:
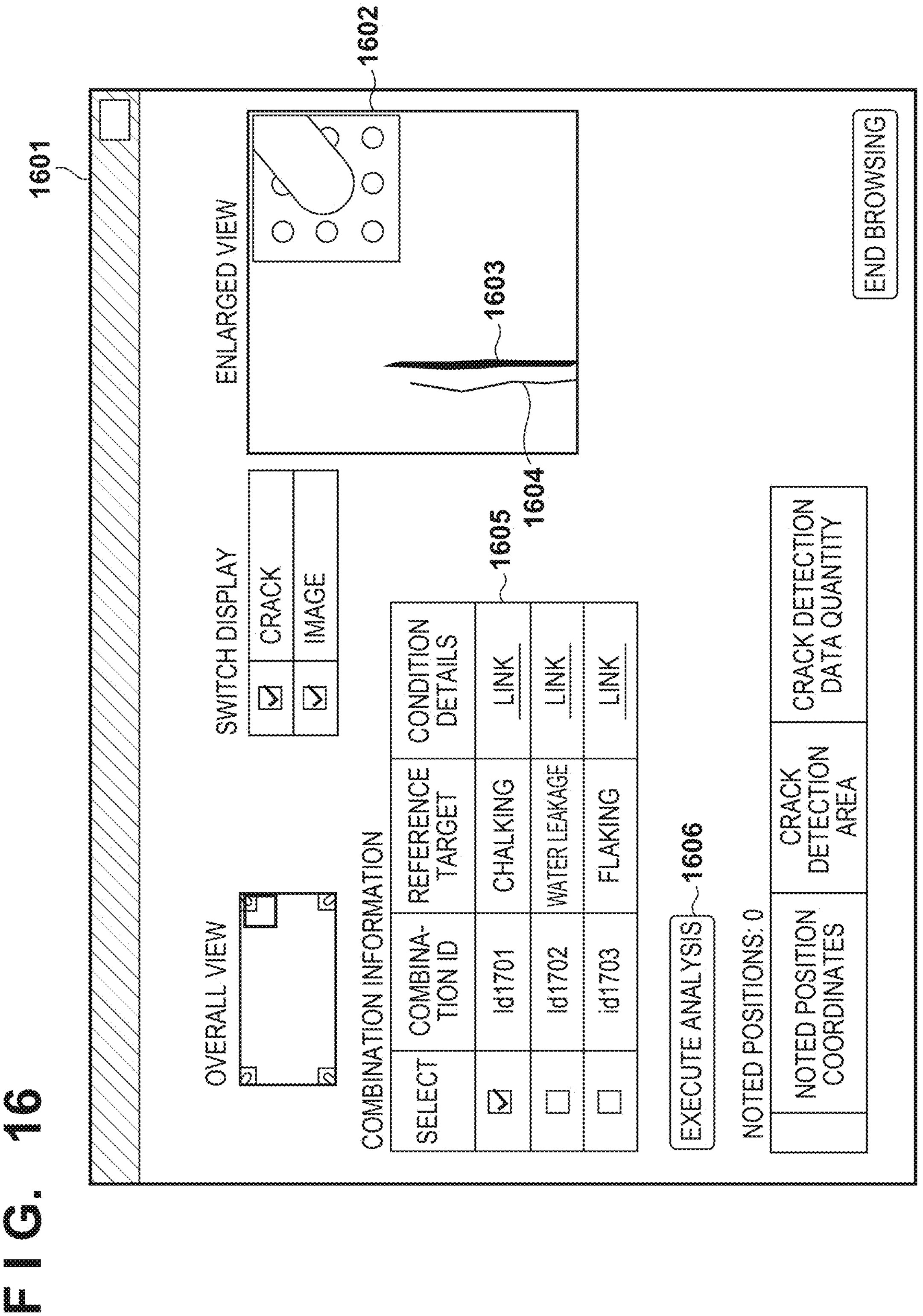
FIG. 16 is a view illustrating an example of receiving selection of combination information.

The display control unit 129 creates and outputs, to the output device 106, display data including the combination information acquired in S403. A screen 1601 of FIG. 16 is an example of a screen displaying a display image based on display data when a crack is the first detection target. An enlarged view 1602 on the screen 1601 is a part of a display image in which an image of the processing target and crack detection data are superimposed, and a crack 1603 and crack data 1604 on the image exist. A combination information list 1605 on the screen 1601 is an example of combination information regarding the first detection target acquired in S403. As for a user certainty factor, an operation of selecting some of combination information from the combination information list 1605 is performed while confirming the image of the processing target and the crack detection data on the screen 1601.

<S1502: Reception Processing of Combination Information>

The reception unit 1401 performs the processing of receiving selection of the combination information by the user. For example, when the user presses an analysis execution button 1606 on the screen 1601 of FIG. 16, the reception unit 1401 acquires the combination information selected by the user from the combination information list 1605 in response to the button pressing operation. In the subsequent processing of S404, using the combination information acquired by the reception unit 1401, the second detection data acquisition unit 126 acquires the second detection data similarly to the processing of the first embodiment.

When the user selects a plurality of pieces of combination information, the reception unit 1401 receives all the plurality of pieces of combination information that are selected. In that case, similarly to the first embodiment, the processing of S404, S405, and S406 may be executed for each piece of combination information.

By using the method described above, the information processing apparatus 100 performs the noted position determination processing using the combination information selected by the user and received by the reception unit 1401. Due to this, the information processing apparatus 100 can generate the display image by the analysis result based on the second detection target in line with the user's desire while suppressing unnecessary calculation cost.

Third Embodiment

In the first embodiment, an example has been described in which a position having a high possibility that detection omission of the detection target such as a crack exists is obtained as a noted position. This detection omission means a noted position where a detection target difficult for an existing AI model to detect exists in the vicinity. Therefore, the image in the vicinity of the noted position is effective data for updating the AI model. Therefore, in the third embodiment, a method of collecting, as learning data, an image in the vicinity of the noted position will be described.

Figure 17:
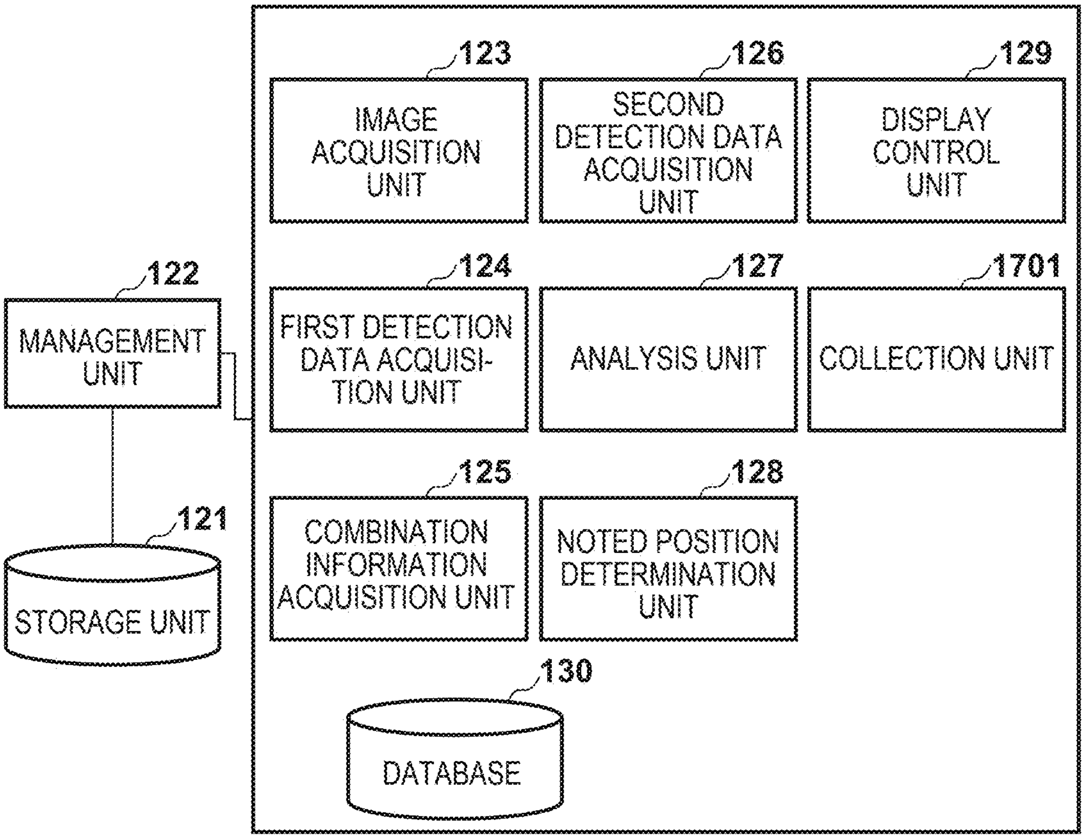
FIG. 17 is a functional block diagram of an information processing apparatus of a third embodiment.

Since the hardware configuration of the information processing apparatus 100 according to the third embodiment is similar to the configuration of the first embodiment illustrated in FIG. 1A, illustration and description thereof are omitted. FIG. 17 is a view illustrating an example of a functional block diagram of the information processing apparatus 100 according to the third embodiment. The functional configuration of FIG. 17 is different from the functional configuration illustrated in FIG. 1B of the first embodiment in that a collection unit 1701 is added. The collection unit 1701 is a functional unit of the control unit 101, and performs processing of collecting learning data.

Figure 18:
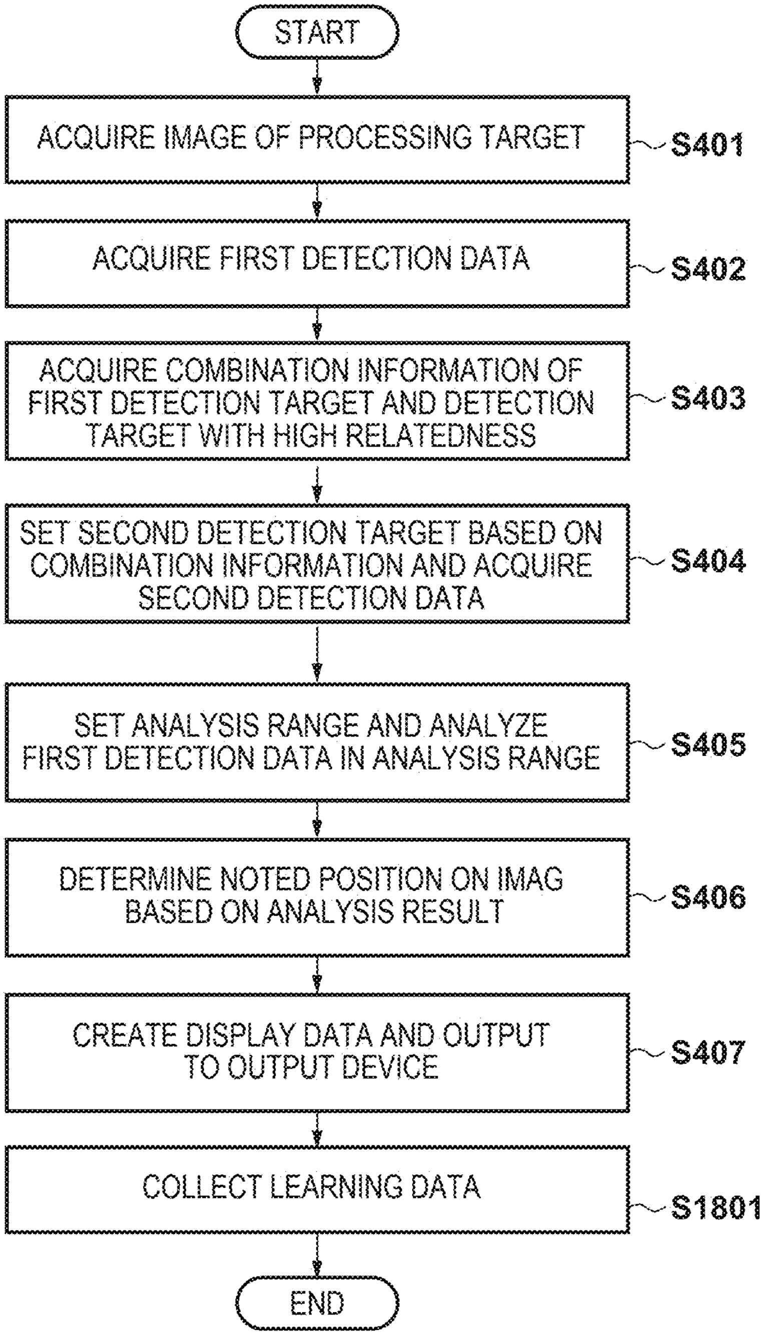
FIG. 18 is a flowchart explaining control processing of the third embodiment.

FIG. 18 is a flowchart showing a main flow of information processing executed by the information processing apparatus 100 according to the third embodiment. In the flowchart of FIG. 18, processing similar to that in the first embodiment is executed in steps denoted by the same numbers as those in the flowchart of FIG. 4 described in the first embodiment. In the case of the third embodiment, after the display control unit 129 outputs display data to the output device 106 in S407, the information processing apparatus 100 proceeds to the processing of S1801. In S1801, the collection unit 1701 performs the processing of collecting learning data. An outline of the processing of S1801 will be described below.

<S1801: Learning Data Collection Processing>

Figure 19A:
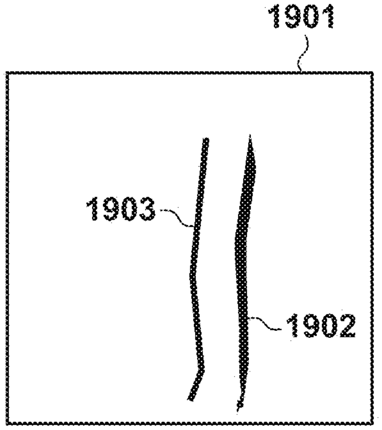
FIG. 19A is a view of an image in the vicinity of a noted position created in the processing of S407 for describing collection processing of learning data.
Figure 19B:
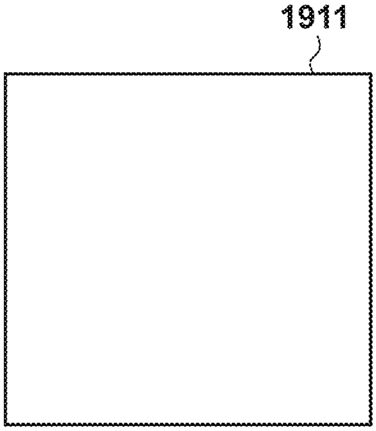
FIG. 19B is a view illustrating an example of crack detection data for describing collection processing of learning data.

In S1801, the collection unit 1701 performs processing of setting a collection range in an image and collecting, as learning data, at least one of an image in the collection range and the first detection data. Description of the learning data collection processing of the present embodiment assumes that a crack is the first detection target and chalking is the second detection target. FIG. 19A illustrates an example of an image 1901 in the vicinity of the noted position created in the processing of S407. A crack 1902 and chalking 1903 that are detection targets exist on the image 1901. FIG. 19B illustrates an example of crack detection data 1911 corresponding to this image 1901. On the crack detection data 1911, no crack data corresponding to the crack 1902 exists.

In this manner, there is a high possibility that a detection target that could not be detected exists in a partial image in the vicinity of the noted position. The collection unit 1701 may set a collection range in the vicinity of the noted position such as this image 1901 and collect, as learning data, a partial image that is an image of the collection range.

The method of setting the image range to be collected as the learning data may be, for example, a setting method of an analysis range regarding the analysis result used in the noted position determination processing in S406. By collecting the partial image in the collection range corresponding to the analysis range, the collection unit 1701 can efficiently collect an image having a high possibility that detection omission exists. The collection unit 1701 may freely change the size of the collection range set based on the analysis range. For example, the collection unit 1701 can change the collection range by setting the analysis range as an initial collection range and expanding the analysis range in any directions on the X axis and the Y axis on the drawing. The collection unit 1701 can also reduce the collection range so as to include at least the analysis range. As a method of setting the collection range, the collection unit 1701 can also set an analysis range including the noted position as a collection range.

As a method of setting the collection range to be collected as the learning data, the collection unit 1701 can also perform determination based on the user's operation instruction. For example, in the processing of S407, the display control unit 129 displays display data including a partial image in the vicinity of the noted position. The user inputs a range desired to collect as learning data while changing a display position and a display range by an operation of the input device on the display data. The collection unit 1701 extracts and collects, as learning data, a partial image corresponding to the range that is input. In this manner, the collection unit 1701 may determine the range of the image to be collected as the learning data based on the user's operation instruction.

The collection unit 1701 may collect the entire image including the noted position as the learning data as the image to be collected as the learning data. By collecting the image including the noted position in units of image, the collection unit 1701 can collect an image having a high possibility that detection omission occurs. Note that the collection unit 1701 may also collect detection data in the learning data collection processing. The collected detection data can be used as an initial value of training data. In this manner, the collection unit 1701 may collect the detection data together with the image.

The analysis unit 127 may set the analysis range based on the correction history of the first detection data by the user and analyze the first detection data in the corrected analysis range. For example, the analysis unit 127 may set, as a new analysis range, the analysis range corrected by the user among the plurality of analysis ranges that are set, and analyze again the first detection data in the analysis range. In this case, the collection unit 1701 may collect, as the learning data, the collection range set based on the correction history of the first detection data by the user in the learning data collection processing.

Figure 19C:
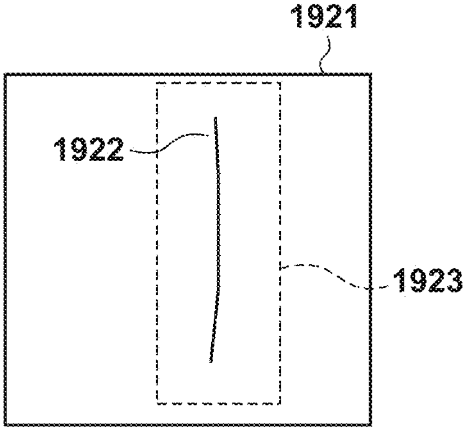
FIG. 19C is a view illustrating an example of crack detection data after the user additionally writes on the crack detection data while visually confirming an image, for describing collection processing of learning data.

The user confirms the detection data of the first detection target while visually confirming the partial image in the vicinity of the noted position on the screen created by the processing of S407. When detection omission is found in the confirmation work, the user additionally writes or corrects the detection data. FIG. 19C illustrates an example of crack detection data 1921 after the user additionally writes on the crack detection data 1911 while visually confirming the image 1901. The crack detection data 1921 is added with crack data 1922 in comparison with the crack detection data 1911. This crack data 1922 corresponds to the crack 1902 on the image 1901. That is, the crack 1902 is a crack that could not be detected by the detection processing, and it is desirable to collect an image around the crack 1902. Specifically, the collection unit 1701 sets a range 1923 surrounding the crack data 1922, and extracts, from the image 1901, and collects a partial image corresponding to the range 1923. The collection unit 1701 may freely change the size of the range 1923 as long as the range includes the coordinates of the crack data 1922. The collection unit 1701 may collect, as learning data, the first detection data such as the crack data 1922 together with the partial image. Due to this, the information processing apparatus 100 can suppress the training data creation cost of the detection target for the image collected as the learning data. As described above, the collection unit 1701 can collect the learning data based on the correction history of the first detection data.

In the information processing apparatus 100, the collection unit 1701 sets a collection range in the vicinity of the noted position and collects a partial image that is an image of the collection range. Due to this, the information processing apparatus 100 can use, as the learning data, the partial image to be noted, and therefore the information processing apparatus 100 can efficiently collect the learning data.

In the information processing apparatus 100, the collection unit 1701 collects, as a partial image, an image in the collection range set based on the analysis range set based on the correction history. Due to this, the information processing apparatus 100 can efficiently collect the learning data because it collects, as a collection range, a corrected range, that is, a range having a high possibility that detection omission has occurred, and collects, as learning data, a partial image in the collection range.

In the information processing apparatus 100, the collection unit 1701 collects, as learning data, the first detection data corrected together with the partial image. Due to this, the information processing apparatus 100 can efficiently perform learning based on the corrected first detection data.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-178384, filed Oct. 16, 2023, which is hereby incorporated by reference herein in its entirety.

What is claimed is:

1. An information processing apparatus comprising:
one or more processors; and
one or more memories including instructions that, when executed by the one or more processors, cause the information processing apparatus to:
acquire an image obtained by capturing a structure in which a detection target exists,
execute first detection data acquisition processing of acquiring first detection data that is data related to a plurality of detection targets detected from the image,
acquire combination information related to a combination of a first detection target included in the plurality of detection targets and a second detection target associated with the first detection target, and
analyze the first detection target of the first detection data based on the second detection target combined with the first detection target indicated by the combination information, and generate an analysis result.

2. The information processing apparatus according to claim 1,
wherein the instructions further cause the information processing apparatus to
generate display data that is data of a display screen based on the analysis result, and display the display screen on a display unit.

3. The information processing apparatus according to claim 1,
wherein the instructions further cause the information processing apparatus to
execute second detection data acquisition processing of acquiring second detection data that is data related to the second detection target detected from the image based on the combination information.

4. The information processing apparatus according to claim 3,
wherein the instructions further cause the information processing apparatus to
select the combination information, and
in the second detection data acquisition processing, acquire the second detection data based on the selected combination information.

5. The information processing apparatus according to claim 3,
wherein the instructions further cause the information processing apparatus to
in generation of the analysis result,
set an analysis range including at least a part of the second detection target in the image based on the second detection data, and
analyze the first detection data in the analysis range and generate an analysis result.

6. The information processing apparatus according to claim 5,
wherein the instructions further cause the information processing apparatus to
determine a noted position within the analysis range based on the analysis result.

7. The information processing apparatus according to claim 6,
wherein the instructions further cause the information processing apparatus to
execute display control processing of generating a partial image including the noted position from the image, generating display data that is data of a display screen including the partial image and the first detection data, and displaying the display screen on a display unit.

8. The information processing apparatus according to claim 7,
wherein in the display control processing, the combination information associated with information related to the noted position is included in the display screen.

9. The information processing apparatus according to claim 6,
wherein the instructions further cause the information processing apparatus to
execute display control processing of generating display data that is data of a display screen based on the analysis range, and displaying the display screen on a display unit.

10. The information processing apparatus according to claim 6,
wherein the instructions further cause the information processing apparatus to
in generation of the analysis result, analyze the first detection data in the analysis range based on a correction history of the first detection data by a user.

11. The information processing apparatus according to claim 6,
wherein the instructions further cause the information processing apparatus to
in determination of the noted position, determine the noted position on the image based on the analysis result and an operation history including a browsing history of the first detection data by a user.

12. The information processing apparatus according to claim 10,
wherein the instructions further cause the information processing apparatus to
collect a partial image of a collection range set based on the analysis range set based on the correction history in the image.

13. The information processing apparatus according to claim 12,
wherein the instructions further cause the information processing apparatus to
in collection of the partial image, collect a partial image in a collection range including the noted position in the image.

14. The information processing apparatus according to claim 12,
wherein the instructions further cause the information processing apparatus to
in collection of the partial image, collect the first detection data included in the partial image.

15. The information processing apparatus according to claim 1, wherein the first detection target is a crack and chalking existing in the structure, and the second detection target is the chalking associated with the crack by the combination information.

16. An information processing method comprising:

acquiring an image obtained by capturing a structure in which a detection target exists;

acquiring first detection data that is data related to a plurality of detection targets detected from the image;

acquiring combination information related to a combination of a first detection target included in the plurality of detection targets and a second detection target associated with the first detection target; and analyzing the first detection target of the first detection data based on the second detection target combined with the first detection target indicated by the combination information, and generating an analysis result.

17. A non-transitory computer-readable storage medium storing a computer program that, when read and executed by a computer, causes the computer to function as an image acquisition unit that acquires an image obtained by capturing a structure in which a detection target exists, a first detection data acquisition unit that acquires first detection data that is data related to a plurality of detection targets detected from the image, a combination information acquisition unit that acquires combination information related to a combination of a first detection target included in the plurality of detection targets and a second detection target associated with the first detection target, and an analysis unit that analyzes the first detection target of the first detection data based on the second detection target combined with the first detection target indicated by the combination information, and generates an analysis result.

* * * * *